(12) United States Patent
Komorida et al.

(10) Patent No.: US 10,336,377 B2
(45) Date of Patent: Jul. 2, 2019

(54) WORK VEHICLE

(71) Applicant: Kubota Corporation, Osaka-shi (JP)

(72) Inventors: Takeshi Komorida, Sakai (JP);
Koichiro Matsumoto, Sakai (JP);
Masaki Takaoka, Sakai (JP); Arisa Kimura, Sakai (JP); Tasuku Teraoka, Sakai (JP); Azusa Furihata, Sakai (JP);
Tomohisa Yamamoto, Sakai (JP);
Toshiki Kanai, Sakai (JP); Nobuyuki Yamashita, Sakai (JP); Masayuki Akita, Sakai (JP); Takashi Kumashiro, Sakai (JP); Ryo Matsumoto, Sakai (JP); Hiroki Nagai, Sakai (JP); Tatsuki Kago, Sakai (JP); Akihito Mihara, Sakai (JP)

(73) Assignee: Kubota Corporation, Osaka (JP)

( * ) Notice: Subject to any disclaimer, the term of this patent is extended or adjusted under 35 U.S.C. 154(b) by 111 days.

(21) Appl. No.: 15/346,231

(22) Filed: Nov. 8, 2016

(65) Prior Publication Data

US 2017/0129544 A1 May 11, 2017

(30) Foreign Application Priority Data

Nov. 9, 2015 (JP) ................................ 2015-219191
Apr. 26, 2016 (JP) ................................ 2016-088381
Apr. 26, 2016 (JP) ................................ 2016-088385

(51) Int. Cl.
*B62D 25/12* (2006.01)
*B62D 29/00* (2006.01)
(Continued)

(52) U.S. Cl.
CPC ........... *B62D 25/12* (2013.01); *B60Q 1/0433* (2013.01); *B62D 25/10* (2013.01); *B62D 29/007* (2013.01);
(Continued)

(58) Field of Classification Search
CPC ............................... B62D 25/10; B62D 25/12
See application file for complete search history.

(56) References Cited

U.S. PATENT DOCUMENTS 2,674,851 A * 4/1954 Wooley .................... B66F 5/04
254/10 B
3,419,099 A 12/1968 Brumbaugh et al.
(Continued)

FOREIGN PATENT DOCUMENTS

EP 2826658 A1 1/2015
JP 200547372 A 2/2005
(Continued)

*Primary Examiner* — Nicole T Verley
(74) *Attorney, Agent, or Firm* — The Webb Law Firm

(57) ABSTRACT

A work vehicle including: a vehicle body frame; a prime mover part located on a front or rear part of the vehicle body frame; a bonnet configured to open and close by swinging, and covering the prime mover part; and an assist unit configured to assist the bonnet to operate to open. A lateral end portion of the vehicle body frame is provided with a first linkage part with which the assist unit is linked. A lateral end portion of a lower end part of the bonnet, which is located closer to an end cover than the first linkage part is, is provided with a second linkage part with which the assist unit is linked. The assist unit is provided with an expansion/contraction mechanism biased so as to expand, and is located laterally outside the prime mover part and spans the first linkage part and the second linkage part.

2 Claims, 27 Drawing Sheets

(51) Int. Cl.
  *B62D 25/10* (2006.01)
  *B60Q 1/04* (2006.01)
(52) U.S. Cl.
  CPC ..... *B60Y 2200/223* (2013.01); *B60Y 2200/92* (2013.01); *B60Y 2410/124* (2013.01)

(56) References Cited

U.S. PATENT DOCUMENTS

| | | | | |
|---|---|---|---|---|
| 4,359,119 A * | 11/1982 | Kammerman | ......... | B62D 25/10 180/69.21 |
| 4,991,675 A * | 2/1991 | Tosconi | ................. | B62D 25/10 180/69.21 |
| 5,791,428 A * | 8/1998 | Noll | ...................... | B62D 25/12 180/69.21 |
| 5,890,556 A * | 4/1999 | Shearn | ................... | B62D 25/12 16/273 |
| 6,092,818 A * | 7/2000 | Shute | ..................... | B62D 25/10 180/69.21 |
| 6,167,977 B1 * | 1/2001 | Adamson | ............... | B62D 25/10 16/289 |
| 6,213,235 B1 * | 4/2001 | Elhardt | ................. | B62D 25/10 180/69.2 |
| 6,910,545 B2 * | 6/2005 | Haun | ..................... | B62D 25/10 180/69.2 |
| 7,036,618 B2 * | 5/2006 | Telford | .................. | B62D 25/10 180/69.2 |
| 7,290,370 B2 * | 11/2007 | McCullough | ......... | E05F 1/1075 49/386 |
| 7,472,946 B2 * | 1/2009 | Hollenbeck | ............ | B62D 25/10 296/190.04 |
| 7,594,555 B2 * | 9/2009 | Lutter | ..................... | B60R 21/34 180/274 |
| 8,096,379 B2 * | 1/2012 | Marsolek | ................ | B62D 25/10 180/69.24 |
| 8,157,042 B2 * | 4/2012 | Fujiki | ................... | A01B 51/026 180/312 |
| 8,646,556 B2 * | 2/2014 | Shimada | ................. | B62D 25/10 180/69.2 |
| 9,073,581 B2 * | 7/2015 | Aoyama | ................. | B60K 13/04 |
| 2015/0101878 A1 * | 4/2015 | Huissoon | .............. | E02F 3/325 180/291 |
| 2017/0129543 A1 * | 5/2017 | Matsumoto | ............ | B62D 25/12 |

FOREIGN PATENT DOCUMENTS

| | | |
|---|---|---|
| JP | 2006290121 A | 10/2006 |
| JP | 2009101747 A | 5/2009 |
| JP | 2011255695 A | 12/2011 |
| JP | 201519612 A | 2/2015 |

* cited by examiner

WORK VEHICLE

CROSS-REFERENCE TO RELATED APPLICATIONS

This application claims priority to Japanese Patent Application No. 2015-219191 filed Nov. 9, 2015 and Japanese Patent Application Nos. 2016-088381 and 2016-088385, both filed Apr. 26, 2016, the disclosures of which are hereby incorporated in their entirety by reference.

BACKGROUND OF THE INVENTION

Field of the Invention

The present invention relates to a work vehicle.

Description of the Related Art

There is a known work vehicle that is provided with: a prime mover part that is located on a front part or a rear part of a vehicle body frame; a bonnet that opens and closes by swinging, and covers the prime mover part; and an assist unit that assists an operation to open the bonnet.

For example, JP 2006-290121A discloses, as such a work vehicle, a tractor that is provided with: a lower cover that is U-shaped, and is open rearward in plan view; an engine bonnet that is supported by a fixing support frame that is provided upright on the front part of the vehicle body frame, the engine bonnet being configured to open and close by swinging in the top-bottom direction about a pivot located forward; and a gas spring that assists an operation to open the engine bonnet. In this tractor, the gas spring spans a central portion, in the left-right direction, of a metal pivot part that is fixed to the inner surface of a front end part of the engine bonnet, and a stay that extends from a central portion, in the left-right direction, of the fixing support frame.

There is a known work vehicle that is provided with: a bonnet that is configured to swing in the top-bottom direction relative to a vehicle body frame; and a lock mechanism that fixes and holds the bonnet at a closed position located downward.

For example, JP 2015-19612A discloses, as the above-described lock mechanism for a work vehicle, a lock mechanism that is provided with: a lock pin that is fixed to a partition of a vehicle body frame; a metal lock part that is provided on the bonnet and is configured to swing between a lock position and an unlock position; a spring that biases the metal lock part such that the metal lock part returns to the lock position; and an operation lever that allows the metal lock part to be operated to the unlock position, opposing the effect of the spring. In this lock mechanism, the operation lever extends upward from the metal lock part such that the operation lever protrudes from an opening formed in the upper surface of the bonnet, to the outside above the bonnet.

For example, JP 2011-255695A discloses, as the above-described lock mechanism for a work vehicle, a lock mechanism that is provided with: a locked member that is fixed to a bonnet; an anti-separation lock member that is provided on a bracket for fixing a vehicle body frame and is configured to swing between a lock position and an unlock position; a biasing spring that biases the anti-separation lock member such that the anti-separation lock member returns to the lock position; and an operation part that allows the anti-separation lock member to be operated to the unlock position, opposing the effect of the biasing spring. In this lock mechanism, the operation part extends downward from the anti-separation lock member in a lateral direction and protrudes from an elongated hole formed in a lower cover of the vehicle body frame, to the outside below the cover.

There is a known work vehicle that is provided with: a passenger vehicle type travelling vehicle body having a headlight; and a front loader that is coupled to a front part of the travelling vehicle body.

For example, JP 2005-47372A discloses a work vehicle that is provided with: a bonnet that is located on a front part of a travelling vehicle body; and a headlight that is provided on a front end part of the bonnet.

SUMMARY OF THE INVENTION

In the configuration disclosed in JP 2006-290121A above, the engine bonnet is configured to open and close by swinging about a pivot located in the front part of the vehicle body. Therefore, if the prime mover part has a configuration in which maintenance-target devices that relatively frequently require maintenance, such as a radiator and an air cleaner, are located in a central part of the prime mover part in terms of the front-rear direction of the vehicle body so as to be separated from the pivot in the front part of the vehicle body, it is possible to widely open a space above the maintenance-target devices by operating the engine bonnet to open. As a result, it is easier to perform maintenance on the maintenance-target devices. Also, with the gas spring, it is easier to operate the engine bonnet to open upward.

However, it is impossible to open both sides of the prime mover part in the left-right direction by operating the engine bonnet to open, and there is room for improvement in terms of making it even easier to perform maintenance on the prime mover part. Also, the gas spring is located in a central portion of the work vehicle in the left-right direction, and therefore it is necessary to secure a space between an upper part of the prime mover part and an upper part of the engine bonnet at the closed position, or between a front part of the prime mover part and a front part of the engine bonnet at the closed position, to store the gas spring therein while preventing the gas spring and the prime mover part from coming into contact with each other. Therefore, the size of the vehicle body may increase, e.g. the front part side of the engine bonnet may bulge upward by a larger amount, or the engine bonnet may bulge forward by a larger amount.

In other words, it is desired to improve the maintainability of the prime mover part in which the maintenance-target devices are located in a central part of the prime mover part in terms of the front-rear direction of the vehicle body, without increasing the size of the vehicle body.

In the configuration disclosed in JP 2015-19612A above, it is easy to release the bonnet from the closed position at which the bonnet is fixed and held, by operating a protruding part of the operation lever that protrudes from the opening in the bonnet to the outside above the bonnet, so that the protruding part swings in a direction that opposes the effect of the spring.

In the configuration disclosed in JP 2011-255695A above, it is easy to release the bonnet from the closed position at which the bonnet is fixed and held, by pulling a protruding part of the operation part that protrudes from the elongated opening in the lower cover to the outside below the cover, in a direction that opposes the effect of the biasing spring.

On the other hand, in the configurations disclosed in JP 2015-19612A and JP 2011-255695A, a portion of the operation part or the like that allows for an operation to unlock the lock mechanism protrudes to the outside, and therefore a person other than the user of the work vehicle can also easily release the bonnet from the closed position at which the bonnet is fixed and held, by operating the protruding portion. Thus, there is room for improvement in terms of preventing the bonnet from being operated to open by a person other than the user.

In other words, there is demand for a lock mechanism for a bonnet that is unlikely to allow a person other than the user to perform an unlock operation, without impairing the user's convenience.

In recent years, loader work often continues until the night due to a shortage of labor.

With the configuration disclosed in JP 2005-47372A above, loader work at night is performed while illuminating forward of the travelling vehicle body using a headlight provided on the front end part of the bonnet. However, it is difficult for the driver to visually check the position of the front end of the bucket or a work object such as dirt located forward of the bucket during, for example, scooping work using a front loader that has been lowered such that the bucket reaches the ground or a position that is substantially on the ground, because the headlight is provided at a low position and light from the headlight is blocked by the bucket or the like.

As a result, it is difficult to perform loader work at night, which leads to the degradation of work efficiency.

In other words, there is demand for improvement in the workability of loader work performed at night.

A work vehicle according to one aspect of the present invention comprises:

a vehicle body frame;

a prime mover part located on a front or rear part of the vehicle body frame;

a bonnet configured to open and close by swinging, and covering the prime mover part; and an assist unit configured to assist an operation to open the bonnet, wherein the bonnet is an integrated member in which: an end cover located on one end part of the vehicle body frame in a front-rear direction, and covering one end part of the prime mover part in the front-rear direction; left and right side covers covering lateral side parts of the prime mover part; and an upper cover covering an upper part of the prime mover part are integrally joined, and is configured to open and close by swinging about a pivot shaft that is located on one end part of the vehicle body frame in the front-rear direction and is orientated in a left-right direction, a lateral end portion of the vehicle body frame is provided with a first linkage part with which the assist unit is linked, a lateral end portion of a lower end part of the bonnet is provided with a second linkage part with which the assist unit is linked, the lateral end portion of the bonnet being located closer to the end cover than the first linkage part is, and the assist unit is provided with an expansion/contraction mechanism biased so as to expand, and is located laterally outside the prime mover part and spans the first linkage part and the second linkage part.

According to this aspect of the present invention, the bonnet is an integrated member in which the end cover, the left and right side covers, and the upper cover are integrally joined. Therefore, the shape retainability of the bonnet is improved. When the bonnet is at the open position, it is possible to widely open the upper part and the left and right lateral side parts of the prime mover part, and therefore it is easier to perform maintenance on the prime mover part. In particular, if the prime mover part has a configuration in which maintenance-target devices that relatively frequently require maintenance, such as a radiator and an air cleaner, are located in a central part of the prime mover part in terms of the front-rear direction of the vehicle body, it is possible to more widely open the upper part and the left and right lateral side parts of the prime mover part, and it is even easier to perform maintenance on the maintenance-target devices.

Also, due to the effect of the assist unit, the operator can easily open and close the heavy bonnet that opens and closes by swinging, and into which the end cover, the left and right side covers, and the upper cover are integrated.

Also, the assist unit is located outside the prime mover part in a leftward direction, and it is unnecessary to secure a space for storing the assist unit between the upper part or one end part, in the front-rear direction, of the prime mover part, and an upper part or one end part, in the front-rear direction, of the bonnet at the closed position. Therefore, it is possible to prevent the size of the vehicle body from increasing due to the storage space being secured between the two parts.

Furthermore, when the bonnet is located at the open position, the assist unit can be located at a position that is close to the lower end part of the bonnet. With this configuration, a problem in which the assist unit hinders maintenance to be performed on the prime mover part when the bonnet is located at the open position is unlikely to occur.

As a result, it is possible to improve the maintainability of the prime mover part without increasing the size of the vehicle body, and in particular, it is possible to improve the maintainability of the prime mover part in which the maintenance-target devices such as a radiator and an air cleaner are located in the central part of the prime mover part in terms of the front-rear direction of the vehicle body.

In the above-described configuration, it is preferable that the assist unit is provided with: a guide member that is located on a portion of the vehicle body frame that is located closer to the end cover than the first linkage part is; and a linkage member that spans the guide member and the second linkage part, the guide member is provided with a guide part configured to guide, in the front-rear direction, a third linkage part that is located on one end side of the linkage member, a portion of the linkage member is provided with a fifth linkage part, the portion being located closer to the guide member than a fourth linkage part is, and the fourth linkage part being linked with the second linkage part, and the expansion/contraction mechanism spans the first linkage part and the fifth linkage part.

With this configuration, when the bonnet is at the closed position, the expansion/contraction mechanism of the assist unit is contracted, and due to this contraction, the third linkage part of the linkage member reaches the end part of the guide part on the first linkage part side, and thus the expansion/contraction mechanism and the linkage member are brought into the state where they are orientated in the front-rear direction and are located close to the vehicle body frame.

Then, in the assist unit, when the bonnet is operated to open, the expansion/contraction mechanism is expanded, and due to this expansion, the third linkage part of the linkage member moves along the guide part towards the end cover, and the linkage member swings about the third linkage part so as to stand up. Thus, the linkage member pushes the second linkage part of the bonnet upward. Thus, the assist unit can assist the operation to open the bonnet.

Thereafter, in the assist unit, the third linkage part reaches the end part of the guide part on the end cover side, the expansion/contraction mechanism stops expanding, and the linkage member stops swinging and is orientated in a predetermined inclined position. Thus, the bonnet is fixed and held at a predetermined open position.

At this point in time, the linkage member is inclined by a relatively large angle in an area on the side of one end of the vehicle body frame in the front-rear direction, and the expansion/contraction mechanism is inclined in an area closer to the central part of the vehicle body in the front-rear direction than the linkage member is, by an angle that is smaller than the inclination angle of the linkage member. With this configuration, compared to the case in which the expansion/contraction mechanism spans the first linkage part and the second linkage part, for example, the inclination angle of the expansion/contraction mechanism when the bonnet is located at the open position is smaller, and the position of the expansion/contraction mechanism is lower. Therefore, a problem in which the assist unit hinders maintenance to be performed on the prime mover part when the bonnet is located at the open position is more unlikely to occur.

Also, it is possible to use a downsized expansion/contraction mechanism, and to reduce the cost required for the expansion/contraction mechanism.

As a result, it is possible to improve the maintainability of the prime mover part while reducing the cost required for the expansion/contraction mechanism.

A work vehicle according to another aspect of the present invention comprises:

a vehicle body frame;

a bonnet configured to swing in a top-bottom direction relative to the vehicle body frame; and a lock mechanism configured to fix and hold the bonnet at a closed position below, wherein the lock mechanism is provided with: a fixed member that is fixed to one of the vehicle body frame and the bonnet; a movable member that is provided on the other of the vehicle body frame and the bonnet and is configured to be movable between a lock position and an unlock position; a biasing member that biases the movable member such that the movable member returns to the lock position, and an operation member that allows the movable member to be operated to the unlock position against an effect of the biasing member, the movable member is provided with: a hook part configured to catch on the fixed member by being located at the lock position when the bonnet is located at the closed position; and a force receiver part that receives an unlock operation force from the operation member, and the operation member is a detachable member provided with an insertion part that is allowed to be inserted into and removed from a through hole that is formed in the vehicle body frame or a cover unit that includes the bonnet, and the insertion part is provided with an operation part that transmits the unlock operation force to the force receiver part when the insertion part is in an in-use state where the insertion part has been inserted into the through hole.

According to this aspect of the present invention, when the user releases the bonnet from the closed position at which the bonnet is fixed and held, the user inserts the insertion part of the operation member owned by the user into the through hole of the vehicle body frame or the cover unit, and transmits an unlock operation force from the operation part of the operation member to the force receiver part of the movable member. Thus, the user can move the movable member from the lock position to the unlock position, opposing the effect of the biasing member. Using this movement, it is possible to release the bonnet from the closed position at which the bonnet is fixed and held by the lock mechanism.

In other words, a user who owns the operation member and knows how to use the operation member can easily release the bonnet from the closed position at which the bonnet is fixed and held by the lock mechanism by using the operation member. Also, a third person who does not own the operation member and does not know how to use the operation member cannot release the bonnet from the closed position at which the bonnet is fixed and held by the lock mechanism by using the operation member.

As a result, it is possible to make it difficult for a third person to perform the operation to release the bonnet from the closed position at which the bonnet is fixed and held by the lock mechanism, without impairing the user's convenience.

In the above-described configuration, it is preferable that the movable member is supported by the vehicle body frame or the bonnet, and is configured to swing, the lock mechanism is provided with: a swinging member that is supported by whichever of the vehicle body frame or the bonnet supports the movable member, and is configured to swing; and a linkage member that spans the swinging member and the motion receiver part, and the swinging member is provided with an operation-target part that faces the through hole and allows the operation part to operate to press the swinging member.

With this configuration, when the user releases the bonnet from the closed position at which the bonnet is fixed and held, the user inserts the insertion part of the operation member owned by the user into the through hole of the vehicle body frame or the cover unit, and transmits an unlock operation force to the force receiver part of the movable member by operating the operation part of the operation member to press the operation-target part of the swinging member. Thus, the user can move the movable member from the lock position to the unlock position, opposing the effect of the biasing member. Using this movement, it is possible to release the bonnet from the closed position at which the bonnet is fixed and held by the lock mechanism.

In other words, the user can easily release the bonnet from the closed position at which the bonnet is fixed and held by the lock mechanism, with a simple operation to insert the operation member into the through hole and press the operation-target part of the swinging member.

By this means, a common tool that can be inserted into the through hole, such as a diver or a hexagonal wrench, can be employed as the operation member, and consequently it is possible to reduce the number of parts required for the lock mechanism.

In the above-described configuration, it is preferable that the movable member is supported by the vehicle body frame or the bonnet, and is configured to swing, the lock mechanism is provided with: a rotation member that is supported by whichever of the vehicle body frame or the bonnet supports the movable member, and is configured to rotate; and a linkage member that spans the rotation member and the motion receiver part, and a rotation center of the rotation member faces the through hole, and a portion of the rotation member that faces the through hole is provided with a coupling part to which the operation part is coupled so as to be rotatable integrally with the coupling part.

With this configuration, when the user releases the bonnet from the closed position at which the bonnet is fixed and held, the user inserts the insertion part of the operation member owned by the user into the through hole of the vehicle body frame or the cover unit to couple the operation part of the operation member with the coupling part of the rotation member, and rotates the rotation member together with the operation member. Thus, the user can transmit an unlock operation force to the force receiver part of the movable member, and move the movable member from the lock position to the unlock position, opposing the effect of the biasing member. Using this movement, it is possible to release the bonnet from the closed position at which the bonnet is fixed and held by the lock mechanism.

In other words, the user can easily release the bonnet from the closed position at which the bonnet is fixed and held by the lock mechanism, with a simple operation to insert the operation member into the through hole to couple the operation member to the rotation member, and rotate the rotation member together with the operation member.

By this means, depending on the shape of the coupling part, a common tool that has an operation part that can be coupled to the coupling part, such as a diver, a hexagonal wrench, or a socket wrench, can be employed, and consequently it is possible to reduce the number of parts required for the lock mechanism.

Also, by employing the operation to rotate the rotation member as the unlock operation, it is possible to make it more difficult for a third person to perform the operation to unlock the lock mechanism.

In the above-described configuration, it is preferable that the coupling part is a groove-shaped part that passes through the rotation center of the rotation member so as to reach an outer periphery of the rotation member, and the operation part is a protruding part that is fittable into the groove-shaped part.

With this configuration, a member having a simple configuration with the protruding part can be employed as the operation member. Consequently, it is possible to reduce the cost required for the lock mechanism.

Also, in the case where the rotation member is provided in a vertical position in which the coupling part is located at the upper end of the rotation member, for example, it is possible to prevent rainwater or washing water from being retained by the coupling part, and it is possible to prevent the coupling part from rusting due to rainwater or the like being retained.

A work vehicle according to another aspect of the present invention comprises:

a passenger vehicle type travelling vehicle body provided with a headlight; and a front loader coupled to a front part of the travelling vehicle body, wherein the travelling vehicle body is provided with a work light for loader work, the work light being located at a position that is upward of the headlight on the travelling vehicle body, and the work light is provided on the travelling vehicle body and faces an obliquely forward and downward direction to illuminate a front end side of the front loader that is grounded.

According to this aspect of the present invention, during loader work performed at night, by using the work light for loader work, it is possible to illuminate the front end part of and forward of the bucket, and so on with bright light from the work light that is unlikely to be blocked by the bucket or the like, by using the work light during, for example, the above-described scooping work performed at a low position.

Thus, for example, during scooping work performed at a low position, it is easier for the driver to visually check the position of the front end of the bucket and the work object such as dirt located forward of the bucket.

Consequently, it is easier to perform loader work at night, and it is possible to prevent the work efficiency of loader work performed at night from being degraded.

In the above-described configuration, it is preferable that the front part of the travelling vehicle body is provided with a bonnet, and the work light is provided on an upper end portion of the front part of the bonnet.

With this configuration, the work light is located at a position that is upward of the headlight on the travelling vehicle body and that is close to the bucket, i.e. the work light is located such that light from the work light is unlikely to be blocked by the bucket, the front end part of the bonnet, or the like, during, for example, scooping work performed at a low position.

Thus, it is possible to illuminate the front end part of and forward of the bucket with bright light from the work light, and, for example, during scooping work performed at a low position, it is even easier for the driver to visually check the position of the front end of the bucket and the work object such as dirt located forward of the bucket.

Consequently, it is even easier to perform loader work at night, and it is possible to more effectively prevent the work efficiency of loader work performed at night from being degraded.

In the above-described configuration, it is preferable that a central portion, in a left-right direction, of an upper end of a front part of the bonnet is provided with an attachment part for a center mascot, and the work light is attached to the attachment part.

With this configuration, it is easy to attach the work light to the central portion, in the left-right direction, of the upper end of the front part of the bonnet, without adding a new configuration for attaching the work light.

Consequently, the configuration is simplified and the attachability is improved, and it is possible to prevent the work efficiency of loader work performed at night from being degraded.

In the above-described configuration, it is preferable that the travelling vehicle body is provided with a front guard that is located forward of a front end part of the travelling vehicle body and protects the front end part, and the work light is attached to an upper end part of the front guard.

With this configuration, the work light can be located at a position that is upward of the headlight on the travelling vehicle body, and that is closest to the bucket and so on. In other words, the work light can be located such that light from the work light is not blocked by the front end part of the travelling vehicle body and is unlikely to be blocked by the bucket during, for example, scooping work performed at a low position.

Thus, it is possible to more appropriately illuminate the front end part of and forward of the bucket with bright light from the work light, and, for example, during scooping work performed at a low position, it is even easier for the driver to visually check the position of the front end of the bucket and the work object such as dirt located forward of the bucket.

Consequently, it is even easier to perform loader work at night, and it is possible to more effectively prevent the work efficiency of loader work performed at night from being degraded.

BRIEF DESCRIPTION OF THE DRAWINGS

FIG. 3 shows the first embodiment, and is a perspective view of a main part, showing configurations of a front guard, a bonnet, and so on;

FIG. 6 shows the first embodiment, and is an exploded perspective view of the main part, showing a configuration of an assist unit and so on;

DETAILED DESCRIPTION OF THE PREFERRED EMBODIMENTS

First Embodiment

The following describes, as an example of a mode for carrying out the present invention, a first embodiment in which the present invention is applied to a tractor that is an example of a work vehicle with reference to the drawings.

Figure 1:
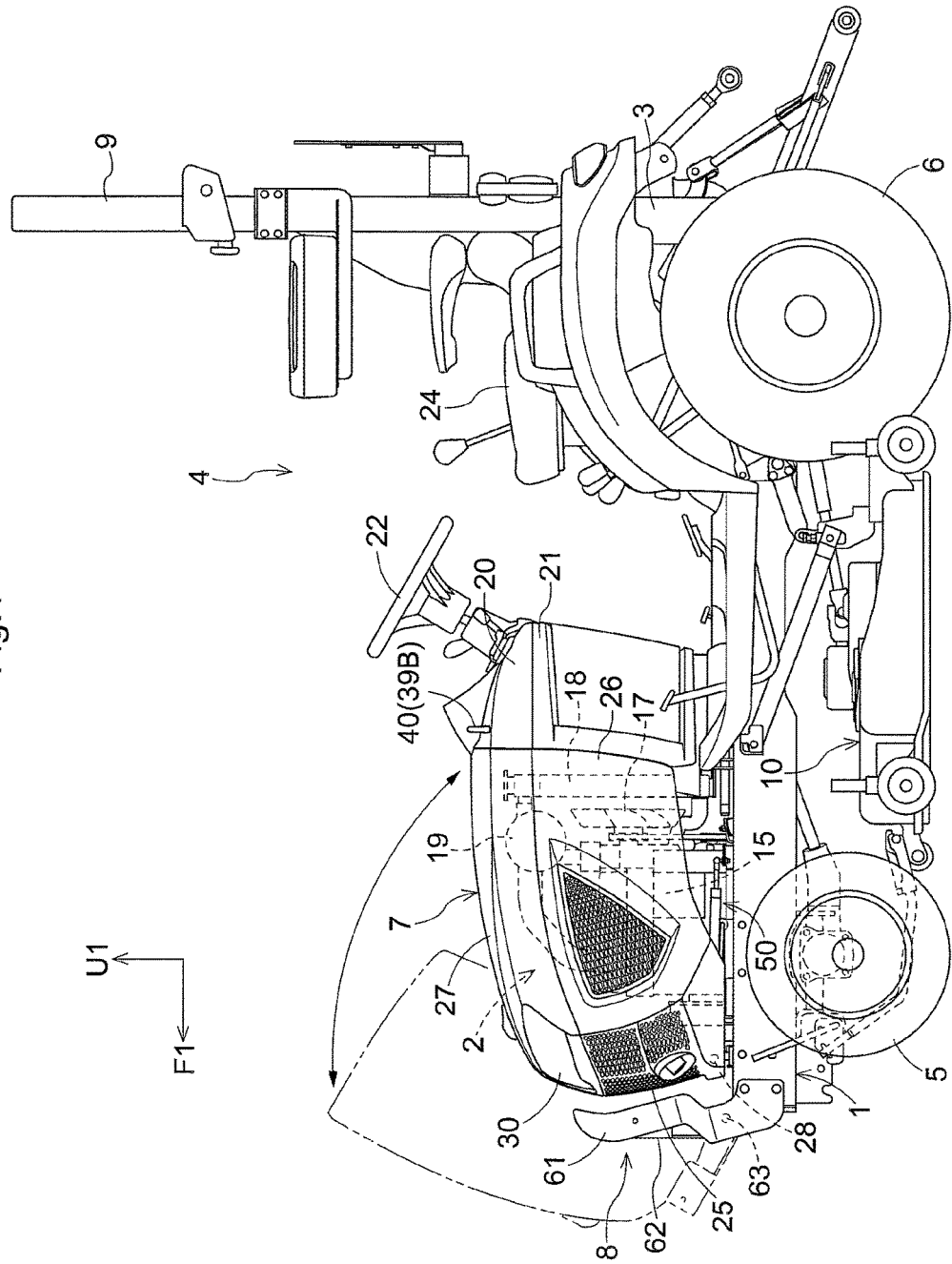
FIG. 1 shows a first embodiment, and is a left-side view of a tractor.

Note that the direction indicated by the arrow with a mark F1 shown in FIG. 1 is the forward direction of the tractor, and the direction indicated by the arrow with a mark U1 is the upward direction of the tractor.

Figure 2:
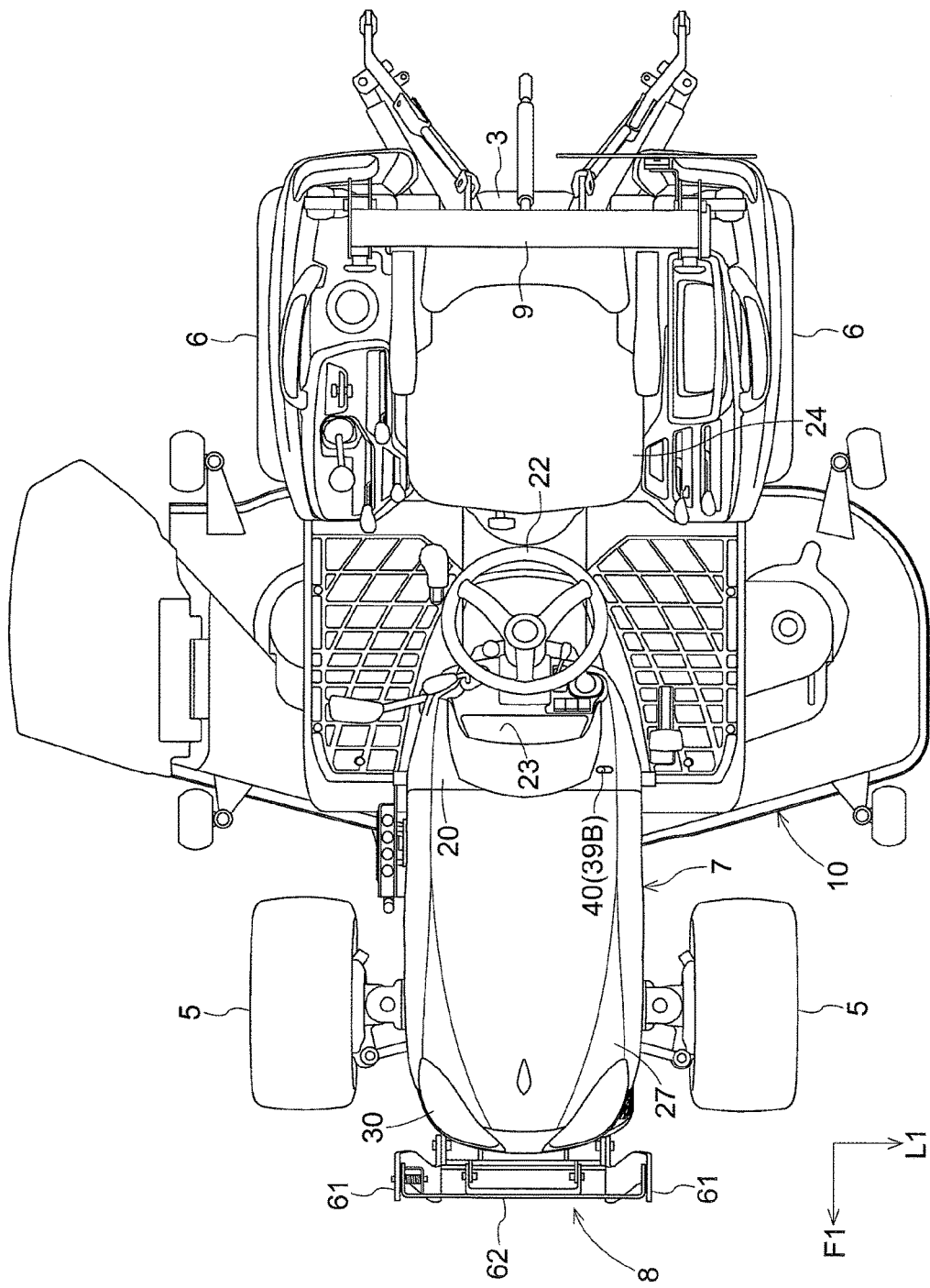
FIG. 2 shows the first embodiment, and is a plan view of the tractor.

The direction indicated by the arrow with the mark F1 shown in FIG. 2 is the forward direction of the tractor, and the direction indicated by the arrow with a mark L1 is the leftward direction of the tractor.

As shown in FIGS. 1 and 2, the tractor described in the first embodiment as an example is provided with, for example: a vehicle body frame 1 that constitutes the framework of a vehicle body; a prime mover part 2 that is located on the front part side of the vehicle body frame 1; a transmission unit 3 that is coupled to a rear part of the vehicle body frame 1; a driving part 4 of a boarding type that is located above the rear part of the vehicle body frame 1; left and right front wheels 5 that are steerable and are driven by a driving force from the prime mover part 2; left and right rear wheels 6 that are steerable and are driven by a driving force from the prime mover part 2; a bonnet 7 that is configured to open and close by swinging, and covers the prime mover part 2; a front guard 8 that is made from a steel plate, and is located immediately forward of the bonnet 7 to protect the bonnet 7; a protection frame 9 that is coupled to a rear end part of the vehicle body frame 1; and a mower 10 that is located on an underbody between the left and right front wheels 5 and the left and right rear wheels 6.

As shown in FIGS. 3 to 6, the vehicle body frame 1 is provided with, for example: left and right side members 11 that are made from steel plates and are elongated in the front-rear direction; a front end member 12 that is made from a steel plate and spans the front ends of the left and right side members 11; a center pillar 13 that is coupled to central parts, in the front-rear direction, of the left and right side members 11; and left and right bonnet-coupling brackets 14 that are coupled to front end parts of the left and right side members 11.

As shown in FIGS. 1, 4, 5, and 8, the prime mover part 2 is provided with, for example: a water-cooled type engine 15 that is supported by the front part of the vehicle body frame 1 so as to be vibration-proof; a muffler 16 that is located immediately forward of the engine 15 and is orientated in the left-right direction; a cooling fan 17 that is located immediately rearward of the engine 15; a radiator 18 that is located immediately rearward of the cooling fan 17; and an air cleaner 19 that is located above the engine 15.

As shown in FIGS. 1, 2, 4, 5, and 8, the upper part side of a rear end part of the prime mover part 2 is covered by an upper panel 20, and the lower part side of the rear end part of the prime mover part 2 is covered by an under panel 21. The under panel 21 is provided with an air intake opening 21A as well as a dust-proof screen 21B that covers the opening 21A.

The driving part 4 is provided with, for example: a steering wheel 22 for steering the front wheels; a display panel 23 that displays, for example, the number of revolutions of the engine; and an operation seat 24 that is located above the transmission unit 3.

As shown in FIGS. 1 to 6, the bonnet 7 is an integrated member in which, for example: a front cover 25 that is an end cover that covers the front end part of the prime mover part 2; left and right side covers 26 that are made from sheet metal and cover lateral side parts of the prime mover part 2; and an upper cover 27 that is made from sheet metal and covers an upper part of the prime mover part 2 are integrally joined. The bonnet 7 opens and closes by swinging about first pivot shafts 28 that are located in the front end part of the vehicle body frame 1 and are orientated in the left-right direction.

Thus, the shape retainability of the bonnet 7 is improved. The bonnet 7 is of a rear-open type that widely opens the rear part side of the prime mover part 2 when located at the open position. As a result, it is easier to perform maintenance on the radiator 18 and so on located on the rear part side of the prime mover part 2.

Figure 3:
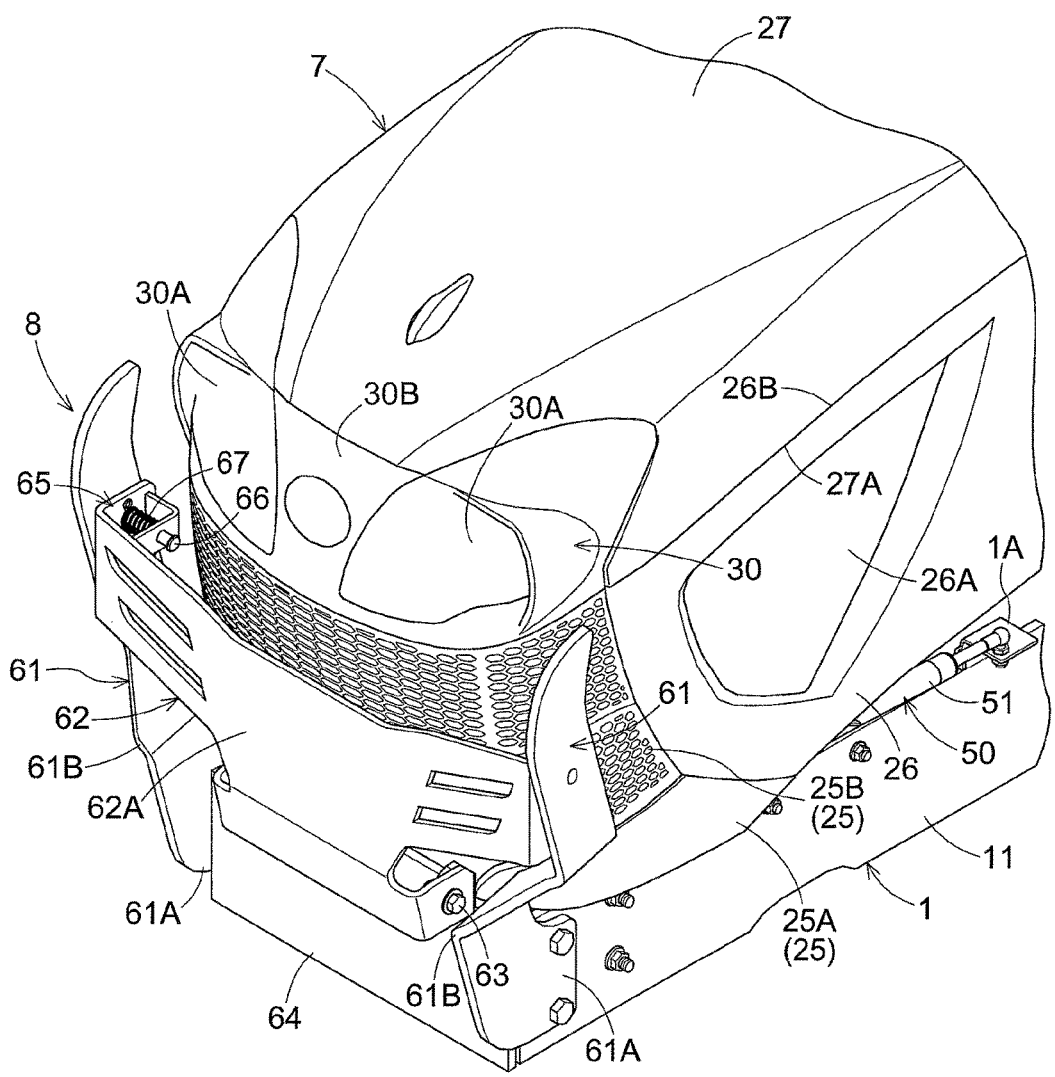
Figure 4:
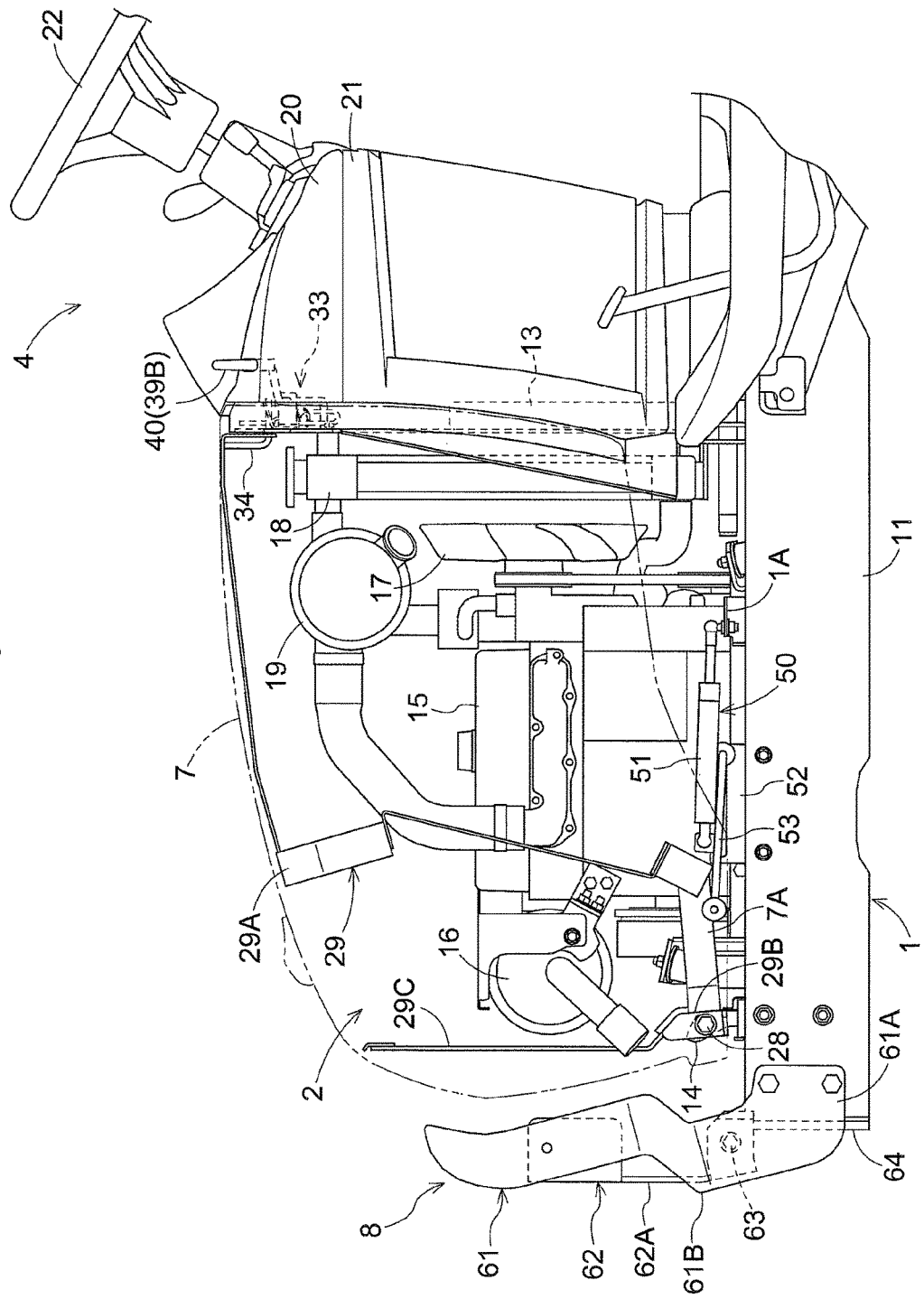
FIG. 4 shows the first embodiment, and is a left side view of the main part, showing a situation in which a second guard member of the front guard is located at a guard position and the bonnet is located at a closed position.
Figure 5:
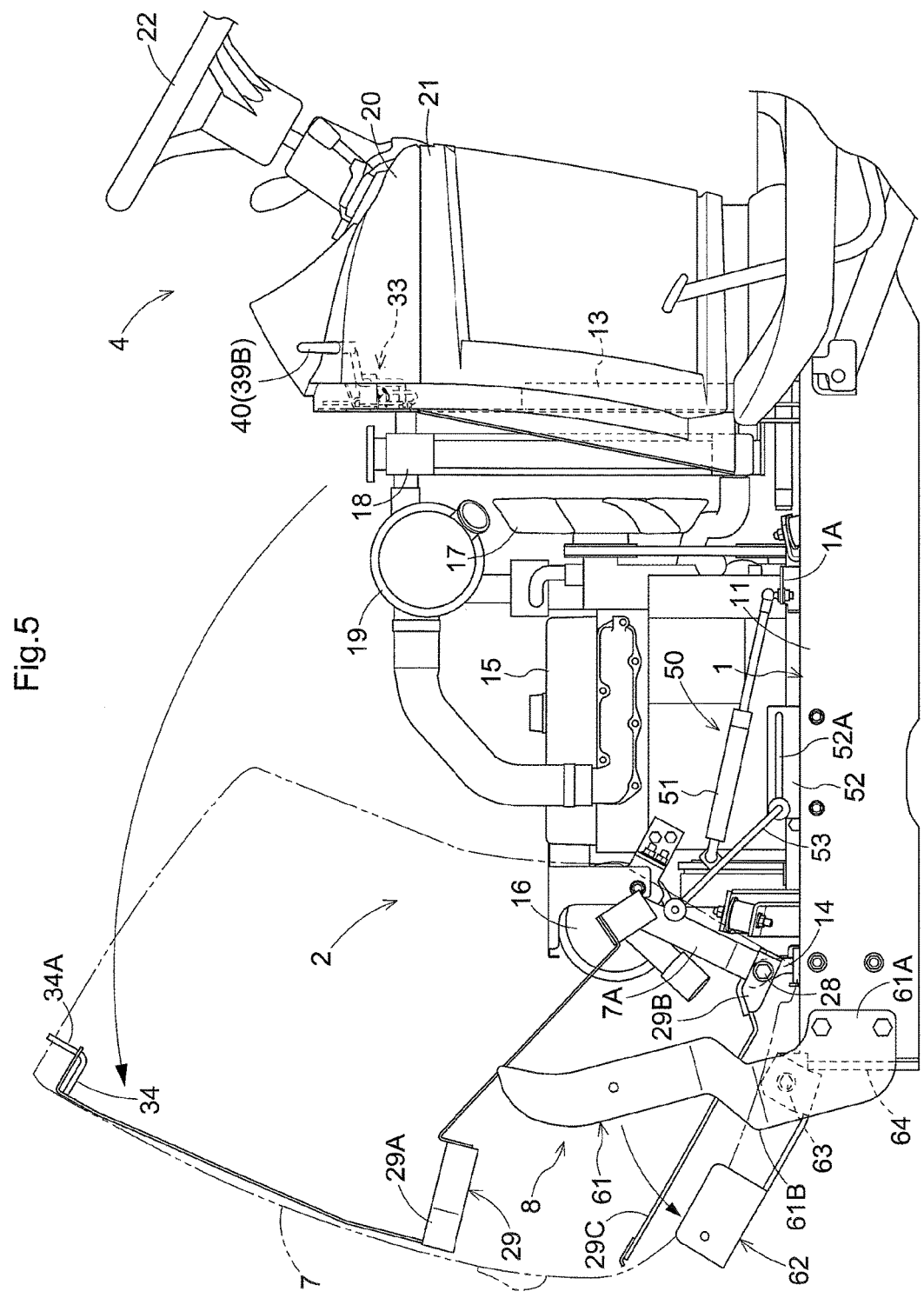
FIG. 5 shows the first embodiment, and is a left side view of the main part, showing a situation in which the second guard member of the front guard is located at a retracted position and the bonnet is located at an open position.

As shown in FIGS. 1 and 3, the front cover 25 is provided with, for example: a first member 25A that is U-shaped in plan view and constitutes a lower end part of the front cover 25; and a second member 25B that serves as an exhaust for cooling air and constitutes the upper side of the front cover 25. A dust-proof screen is employed as the second member 25B. Each of the left and right side covers 26 is provided with a dust-proof screen 26A that serves as an exhaust for cooling air.

As shown in FIGS. 1 to 7, the bonnet 7 is provided with, for example: a bonnet frame 29 that is made from a steel plate and constitutes the framework of the bonnet 7; and a headlight 30 that is provided with left and right light parts 30A and a frame part 30B.

The upper cover 27 is welded to an upper part 29A of the bonnet frame 29. Upper edges 26B of the left and right side covers 26 are welded to left and right lower edges 27A of the upper cover 27.

A lower end portion of the front end part of the bonnet frame 29 is provided with left and right first coupling parts 29B. The left and right first coupling parts 29B are coupled to the left and right brackets 14 of the vehicle body frame 1 with left and right bolts 28 that serve as the first pivot shafts 28 orientated in the left-right direction being interposed therebetween.

The bonnet frame 29 is provided with a second coupling part 29C at a central portion, in the left-right direction, of the front end part thereof. The front cover 25 is coupled to the lower side of the second coupling part 29C, and the headlight 30 is coupled to an upper end part of the second coupling part 29C. Left and right end parts of the front cover 25 are coupled to front end parts of the left and right side covers 26. Left and right end parts of the headlight 30 are coupled to left and right front end parts of the upper cover 27.

Thus, the bonnet 7 is an integrated member into which the front cover 25, the left and right side covers 26, the upper cover 27, the bonnet frame 29, and the headlight 30 are integrated, and is configured to open and close by swinging about the left and right first pivot shafts 28 that are located in a lower end portion of a front end part of the bonnet 7 and are orientated in the left-right direction.

Figure 7:
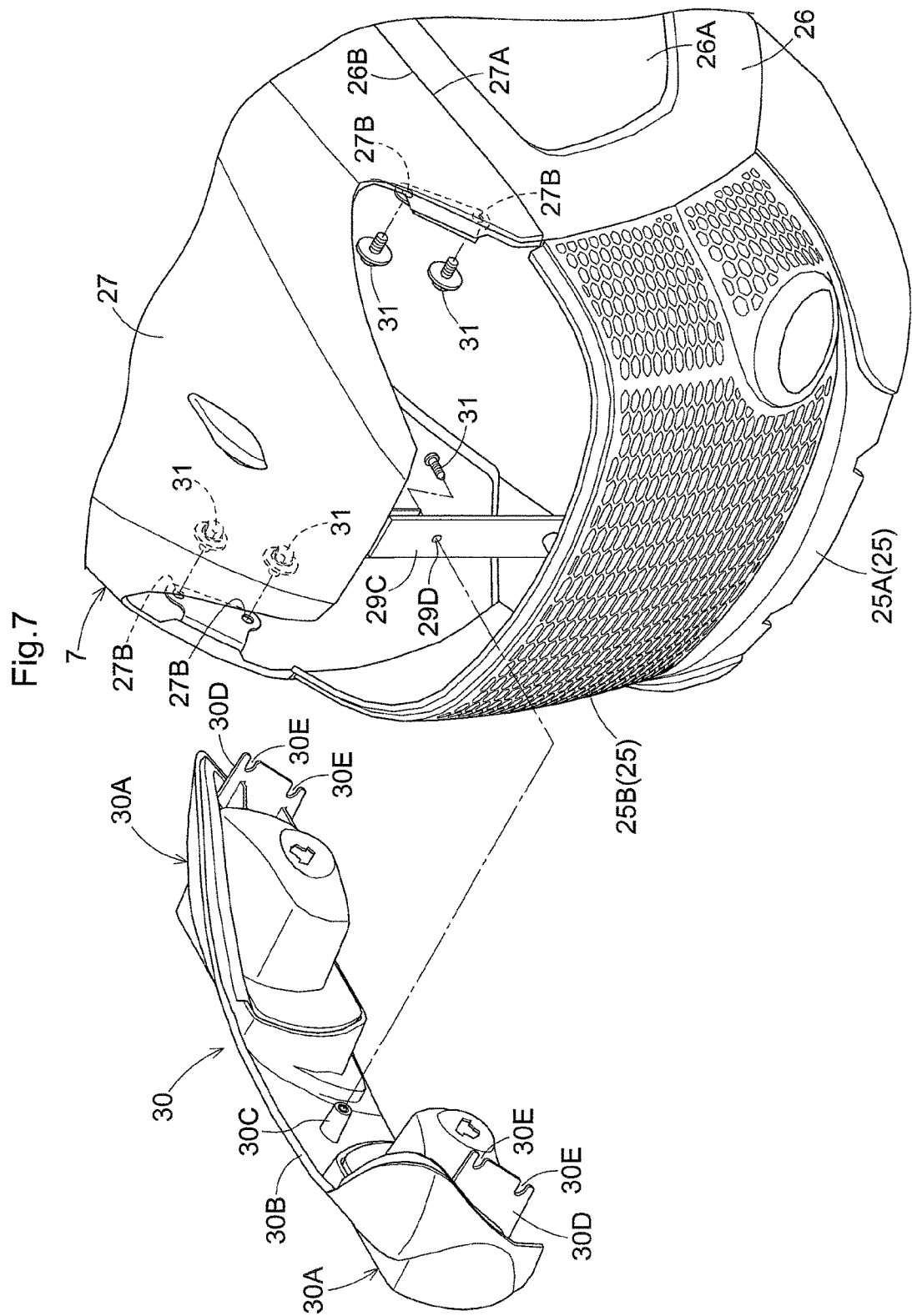
FIG. 7 shows the first embodiment, and is an exploded perspective view of the main part, showing a configuration of a structure for attaching a headlight.
Figure 8:
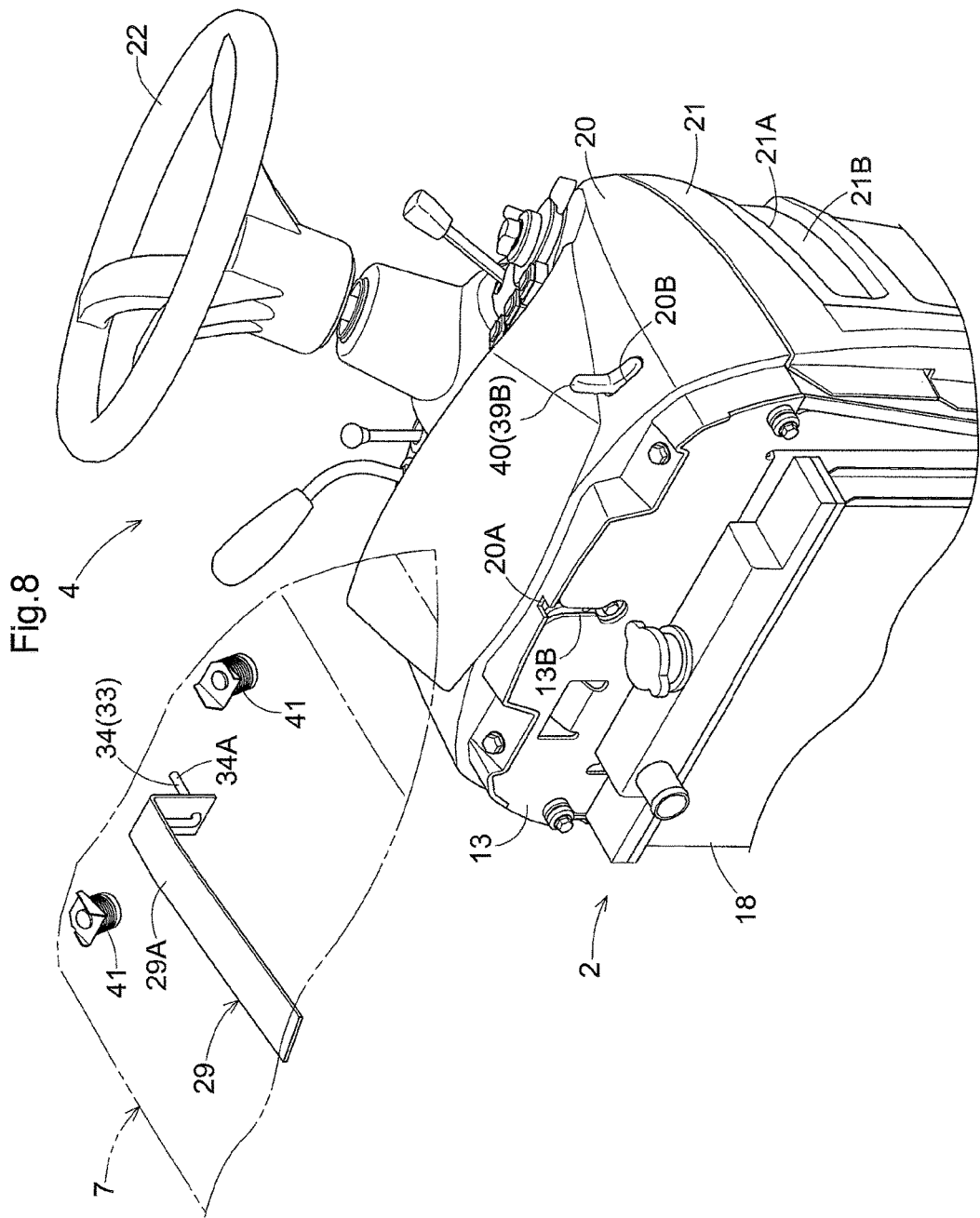
FIG. 8 shows the first embodiment, and is a perspective view of the main part, showing a configuration for, for example, fixing and holding the bonnet.
Figure 9:
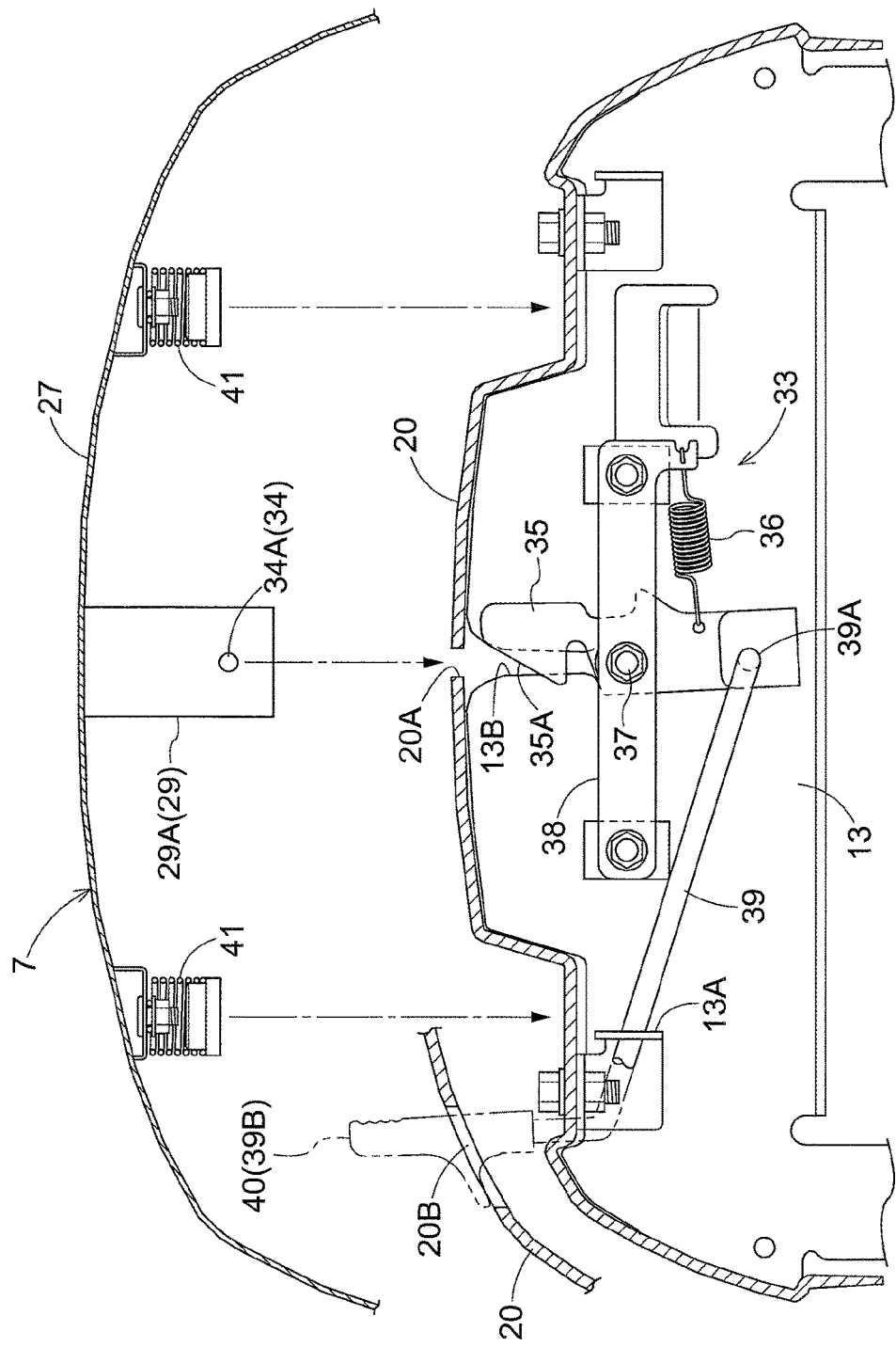
FIG. 9 shows the first embodiment, and is a vertical cross-sectional rear view of the main part, showing a situation in which the bonnet is not fixed or held by a lock mechanism.
Figure 10:
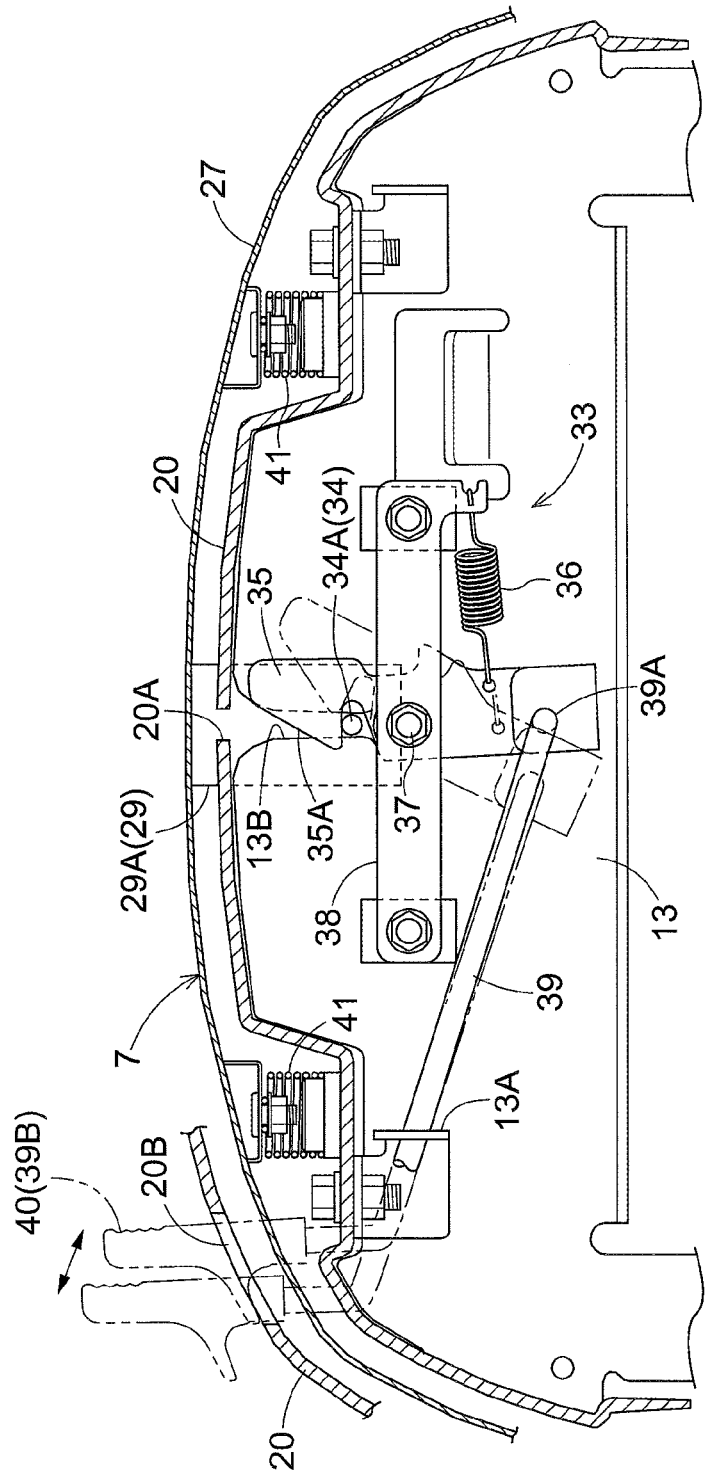
FIG. 10 shows the first embodiment, and is a vertical cross-sectional rear view of the main part, showing a situation in which the bonnet has been fixed and held by the lock mechanism, and a situation in which the bonnet is unfixed.
Figure 11:
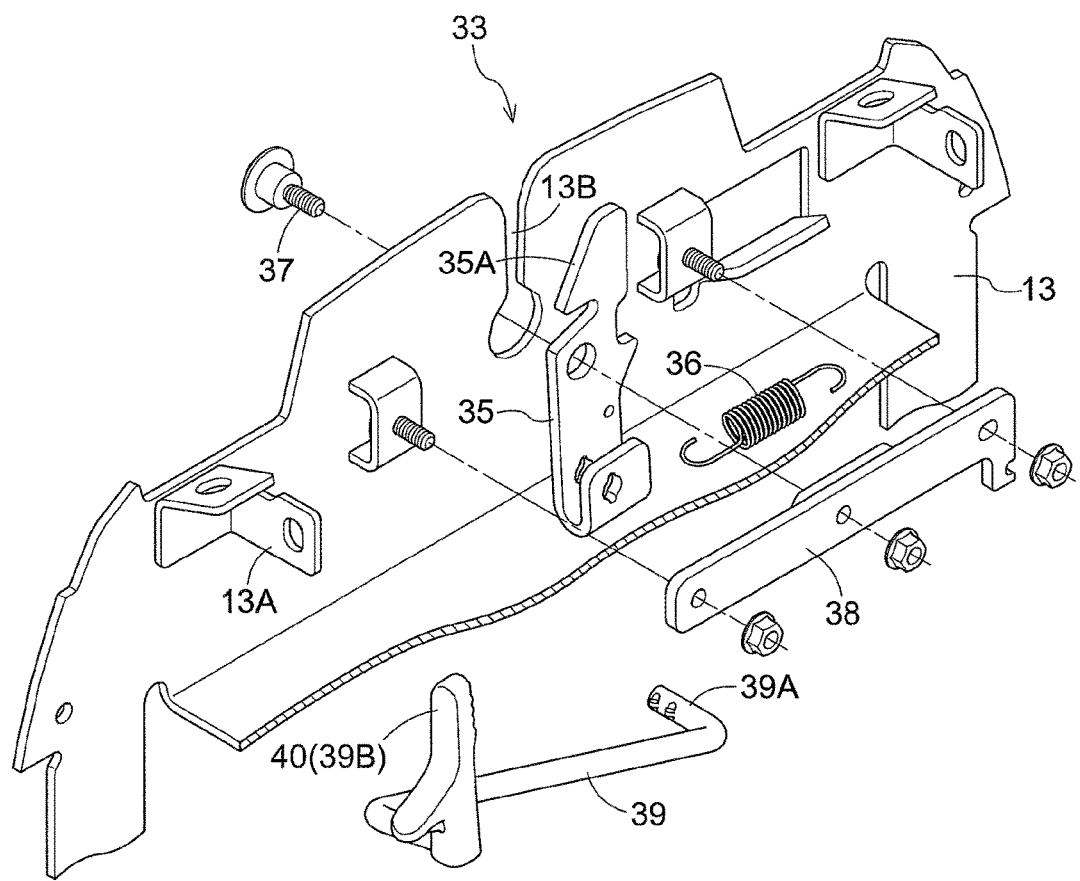
FIG. 11 shows the first embodiment, and is an exploded perspective view of the main part, showing a configuration of the lock mechanism.

As shown in FIG. 7, the headlight 30 is provided with a female screw part 30C that is located at a central part of the frame part 30B in the left-right direction and that is coupled to the second coupling part 29C of the bonnet frame 29. An upper end part of the second coupling part 29C of the bonnet frame 29 is provided with a single through-hole 29D into which a bolt is to be inserted.

Left and right end portions of the frame part 30B of the headlight 30 are provided with coupling parts 30D that are coupled to left and right end parts of the upper cover 27. The left and right coupling parts 30D are provided with upper and lower recessed parts 30E that are recessed forward from the rear ends of the left and right coupling parts 30D and into which bolts are to be inserted. The front end portions of the left and right end parts of the upper cover 27 are provided with two female screw parts 27B that are arranged along the top-bottom direction.

With this configuration, the headlight 30 can be easily attached to the upper cover 27 and the bonnet frame 29 by using five bolts 31.

Figure 6:
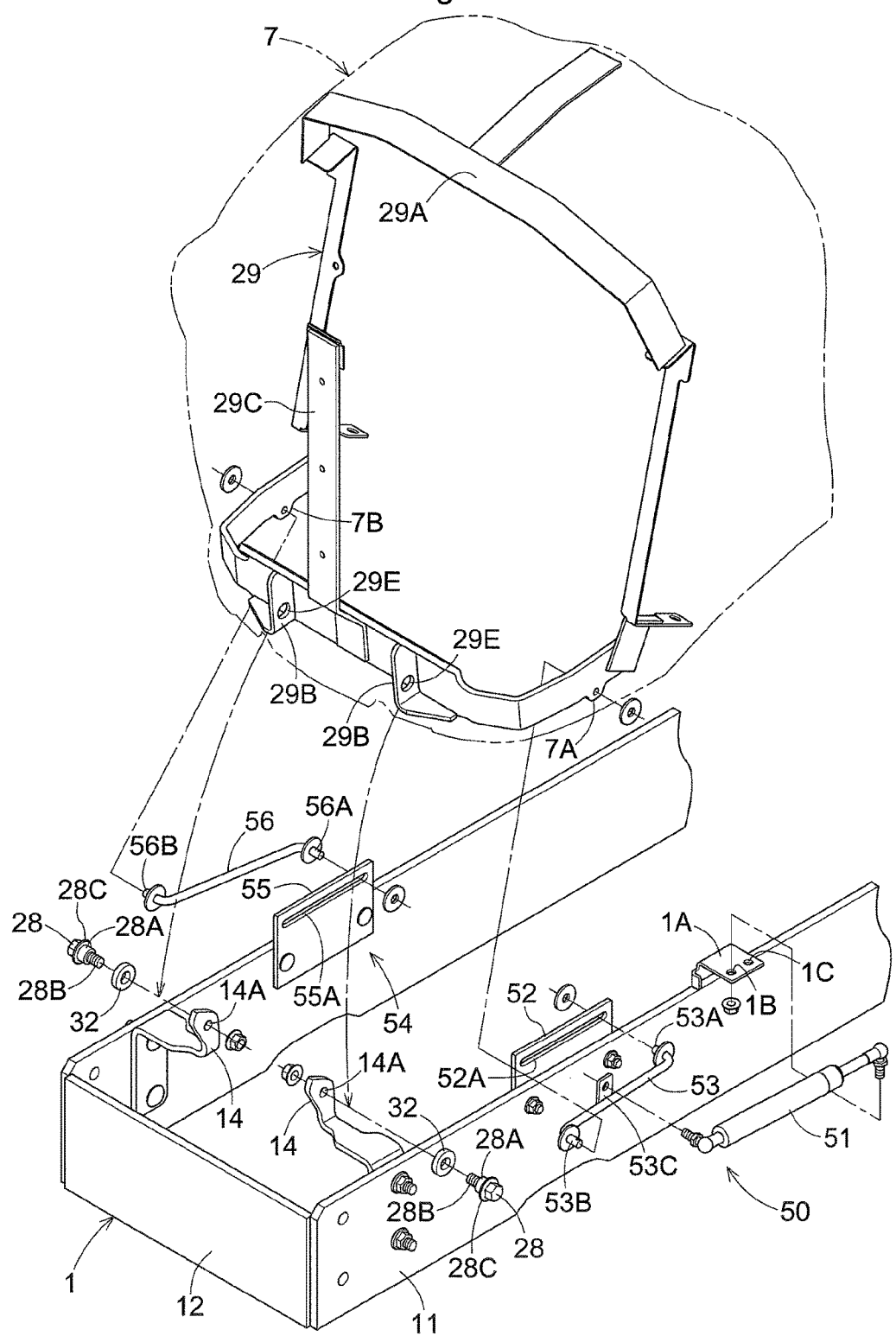

As shown in FIG. 6, step bolts are employed as the left and right bolts 28 that serve as the first pivot shafts 28. Each step bolt is provided with, for example: a large-diameter part 28A that is inserted into a through hole 29E of a first coupling part 29B on the bonnet side; and a small-diameter male screw part 28B that is inserted into a through hole 14A of a bracket 14 of the vehicle body frame 1.

With this configuration, the gaps between the left and right bolts 28 and the left and right first coupling parts 29B can be reduced. As a result, it is possible to prevent a problem in which the front end part of the bonnet 7 rattles in the radial direction of the bolts 28.

Ring-shaped cushion rubbers 32 are fitted onto the large-diameter parts 28A of the left and right bolts 28. In a situation where the vehicle body frame 1 and the bonnet 7 are coupled to each other by using the left and right bolts 28 or the like, each cushion rubber 32 is sandwiched between a flange part 28C of the corresponding bolt 28 and the corresponding first coupling part 29B on the bonnet side.

As a result, it is possible to prevent a problem in which the front end part of the bonnet 7 rattles in the radial direction of the bolts 28 and the left-right direction. Also, when the operator performs an operation to open or close the bonnet 7, it is possible to provide the operator with an appropriate sense of resistance, and consequently the operator is provided with improved operational feeling when opening or closing the bonnet 7.

As shown in FIGS. 4, 5, and 8 to 11, the bonnet 7 is fixed and held at the closed position by a lock mechanism 33. The lock mechanism 33 is provided with, for example: a rod 34 that is bent in an L-shape; a hook member 35 that swings in the left-right direction; and an extension spring 36 that biases the hook member 35 such that the hook member 35 returns to a lock position.

The rod 34, which has a catch part 34A that is orientated in the front-rear direction, is fixed to a central portion, in the left-right direction, of an upper part of a rear end part of the bonnet 7. The hook member 35 is attached to a central part, in the left-right direction, of a support member 38 that is fixed to an upper part of the center pillar 13, by using, for example, a bolt 37 that is orientated in the front-rear direction and serves as the pivot of swing of the hook member 35. An upper part of the hook member 35 is provided with a linkage part 35A that allows for an operation to swing to an unlock position using the catch part 34A. The extension spring 36 spans a right end part of the support member 38 and the hook member 35.

A central portion, in the left-right direction, of the upper part of the center pillar 13 is provided with a recessed part 13B that allows the catch part 34A to be inserted or removed when the bonnet 7 is operated to swing. A central portion, in the left-right direction, of an upper part of the upper panel 20 is provided with a recessed part 20A that allows the catch part 34A to pass through when the bonnet 7 is operated to swing.

The catch part 34A comes into contact with the linkage part 35A in conjunction with the operation of the bonnet 7 to swing to the closed position, and consequently the hook member 35 swings to retract toward the unlock position, opposing the effect of the extension spring 36. Then, as the bonnet 7 approaches the closed position, the hook member 35 returns to the lock position due to the effect of the extension spring 36, in conjunction with the catch part 34A moving to a position below the linkage part 35A, and the hook member 35 catches on the catch part 34A. Thus, the lock mechanism 33 can fix and hold the bonnet 7 at the closed position.

As shown in FIGS. 1, 2, 4, 5, and 8 to 11, the lock mechanism 33 is provided with an operation rod 39 that allows the hook member 35 to be operated to swing to the unlock position opposing the effect of the extension spring 36. The operation rod 39 is supported by a support part 13A that is provided on an upper left part of the center pillar 13, and is configured to slide in the left-right direction. Of the operation rod 39, a right end part 39A is connected to the hook member 35, and a left end part 39B protrudes upward from an opening 20B in a left end part of the upper panel 20, and serves as an operation part 39B for unlocking. A grip 40 made of resin is fitted onto the operation part 39B.

In this way, the operation part 39B for unlocking is located on the left end part of the upper panel 20, and therefore the operator can smoothly operate the operation part 39B from the driving part 4 without being hindered by the steering wheel 22 located in a central part of the upper panel 20 in the left-right direction. As a result, the operator can easily release the bonnet 7 from the closed position at which the bonnet 7 is fixed and held by the lock mechanism 33, by operating the operation part 39B from the driving part 4.

The bonnet 7 is provided with left and right compression springs 41 that are received and supported by the center pillar 13 with the upper panel 20 interposed therebetween. The left and right compression springs 41 raise the bonnet 7 upward from the closed position upon the bonnet 7 being released from the closed position at which the bonnet 7 is fixed and held by the lock mechanism 33, and receive and hold the bonnet 7 at an unlock position that is located slightly above the closed position. The left and right compression springs 41 allow the bonnet 7 to swing and shift to the closed position when the bonnet 7 is operated to swing downward opposing the effect of the left and right compression springs 41.

As a result, it is possible to prevent a problem in which the bonnet 7 becomes fixed and held again at the closed position by the lock mechanism 33 when the hook member 35 returns to the lock position after the unlocking operation has been performed, due to the bonnet 7 being located at the closed position after the unlocking operation of the lock mechanism 33 has been performed. Also, in a situation where the bonnet 7 is fixed and held at the closed position, it is possible to prevent a problem in which the rear end part of the bonnet 7 rattles.

The configuration of the lock mechanism 33 can be variously modified, and the following describes representative examples of modifications.

Figure 12:
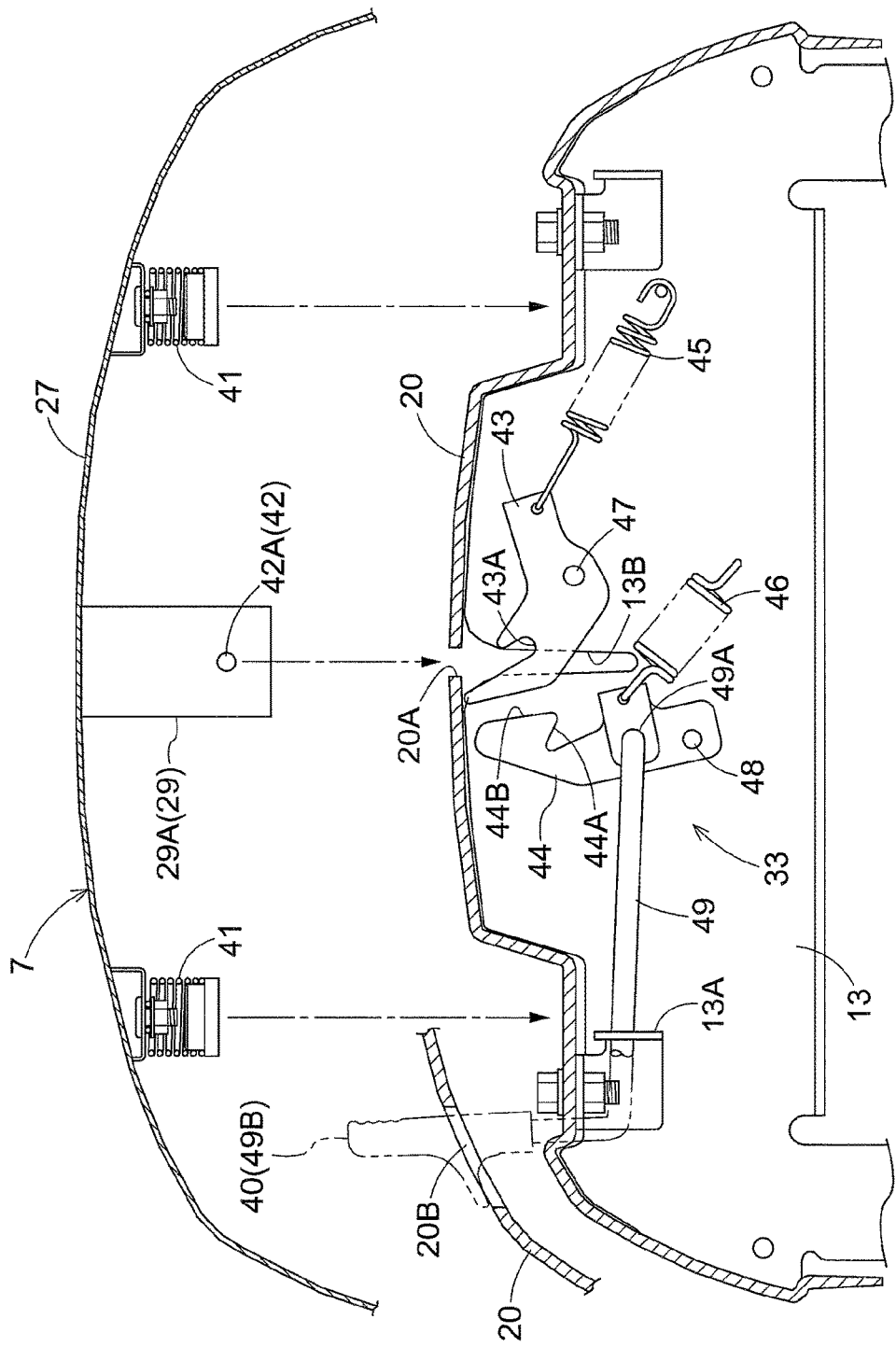
FIG. 12 shows another embodiment modified from the first embodiment, and is a vertical cross-sectional rear view of the main part, showing a situation in which the bonnet is not fixed or held by the lock mechanism.
Figure 13:
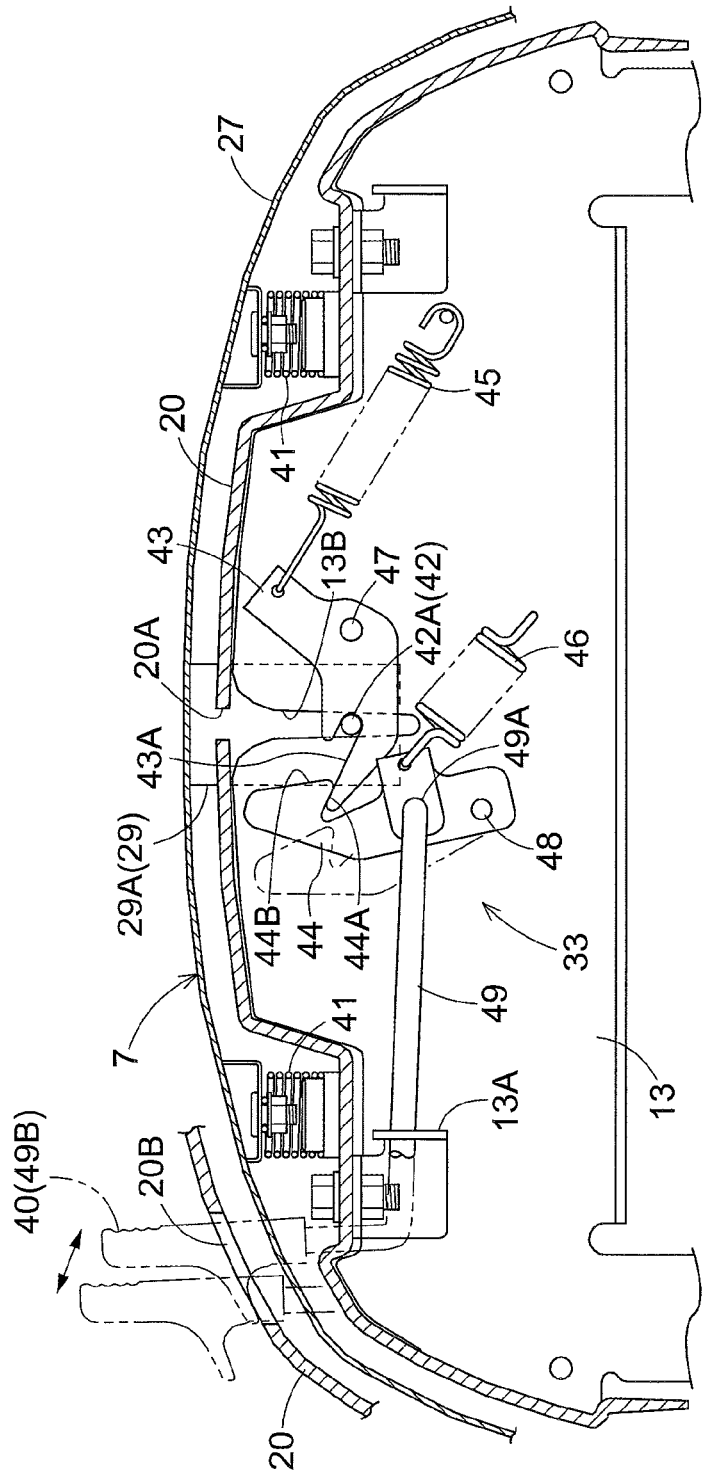
FIG. 13 shows the other embodiment modified from the first embodiment, and is a vertical cross-sectional rear view of the main part, showing a situation in which the bonnet has been fixed and held by the lock mechanism, and a situation in which the bonnet is unfixed.

As shown in FIG. 12 and FIG. 13, the lock mechanism 33 is provided with, for example: a rod 42 that is provided with a catch part 42A that is orientated in the front-rear direction; a first swinging member 43 that is provided with a two-pronged receiver part 43A and swings in the top-bottom direction; a second swinging member 44 that is provided with a hook part 44A and swings in the left-right direction; a first extension spring 45 that biases the first swinging member 43 such that the first swinging member 43 returns upward to the unlock position; and a second extension spring 46 that biases the second swinging member 44 such that the second swinging member 44 returns to the lock position.

The rod 42 is fixed to a central portion, in the left-right direction, of the rear end part of the upper part of the bonnet 7. The first swinging member 43 is attached to a central part, in the left-right direction, of the upper part of the center pillar 13 by using, for example, a first bolt 47 that is orientated in the front-rear direction and serves as the pivot of swing of the first swinging member 43. The swing positions of the first swinging member 43 are set such that the receiver part 43A takes an upward open position when the first swinging member 43 is at the unlock position located upward, and the receiver part 43A takes a leftward open position when the first swinging member 43 is at the lock position located downward. The second swinging member 44 is attached to a central part, in the left-right direction, of the upper part of the center pillar 13 by using, for example, a second bolt 48 that is orientated in the front-rear direction and serves as the pivot of swing of the second swinging member 44. The hook part 44A of the second swinging member 44 is provided with a linkage part 44B that allows for an operation to swing leftward to an unlock position using the first swinging member 43. The first extension spring 45 spans the center pillar 13 and the first swinging member 43. The second extension spring 46 spans the center pillar 13 and the second swinging member 44.

The receiver part 43A receives the catch part 42A in conjunction with the operation of the bonnet 7 to swing to the closed position, and consequently the first swinging member 43 swings downward to the lock position opposing the effect of the first extension spring 45. At this point in time, the receiver part 43A guides the catch part 42A downward to the lock position while changing the position thereof from the upward open position at the unlock position to the leftward open position at the lock position. The receiver part 43A comes into contact with the linkage part 44B in conjunction with the downward swing of the first swinging member 43 to the lock position, and consequently, the second swinging member 44 swings to retract leftward to the unlock position opposing the effect of the second extension spring 46. Then, as the bonnet 7 approaches the closed position, the second swinging member 44 returns rightward to the lock position due to the effect of the second extension spring 46, in conjunction with the receiver part 43A moving to a position below the linkage part 44B, and the hook part 44A catches on the receiver part 43A that is in the leftward open position, in conjunction with the returning of the second swinging member 44. As a result, the catch part 42A can be held at the lock position together with the first swinging member 43, and the bonnet 7 can be fixed and held at the closed position.

The lock mechanism 33 is provided with an operation rod 49 that allows the second swinging member 44 to be operated to swing to the unlock position opposing the effect of the second extension spring 46. The operation rod 49 is supported by the support part 13A that is provided on an upper left part of the center pillar 13, and is configured to slide in the left-right direction. Of the operation rod 49, a right end part 49A is connected to the second swinging member 44, and a left end part 49B protrudes upward from the opening 20B in a left end part of the upper panel 20, and serves as a driving part 49B for unlocking. The grip 40 made of resin is fitted onto the driving part 49B.

In this way, the driving part 49B for unlocking is located on the left end part of the upper panel 20, and therefore the operator can smoothly operate the driving part 49B from the driving part 4 without being hindered by the steering wheel 22 located in the central part of the upper panel 20 in the left-right direction. As a result, the operator can easily release the bonnet 7 from the closed position at which the bonnet 7 is fixed and held by the lock mechanism 33, by operating the driving part 49B from the driving part 4.

As shown in FIGS. 1 and 3 to 6, this tractor is provided with an assist unit 50 that assists an operation to open the bonnet 7. The assist unit 50 is provided with an expansion/contraction mechanism 51 that is biased so as to expand, and assists the operation to open the bonnet 7 by using the expansion/contraction mechanism 51 that operates to expand. A gas spring 51 that is biased to expand using a compression gas inside is employed as the expansion/contraction mechanism 51. The left side member 11, out of the left and right side members 11 located on lateral end portions of the vehicle body frame 1, is provided with a first linkage part 1A with which the assist unit 50 is linked. A lateral end portion on the left side of a front lower end part of the bonnet 7 is provided with a second linkage part 7A with which the assist unit 50 is linked. The lateral end portion of the bonnet 7 is located closer to the front cover than the first linkage part 1A is. The assist unit 50 is located outside the prime mover part 2 in a leftward direction, and spans the first linkage part 1A and the second linkage part 7A.

Thus, the shape retainability of the bonnet 7 is improved. When the bonnet 7 is at the open position, it is possible to widely open the upper part and the left and right lateral side parts of the prime mover part 2, and therefore it is easier to perform maintenance on the prime mover part 2. In particular, it is easier to perform maintenance on the radiator 18, the air cleaner 19, and so on that are located in the rear part of the prime mover part 2 that is on the side of the center of the vehicle body in the front-rear direction.

Also, due to the effect of the assist unit 50, the operator can easily open and close the heavy bonnet 7 into which the front cover 25, the left and right side covers 26, the upper cover 27, and so on are integrated, and that opens and closes by swinging.

The assist unit 50 is located outside the prime mover part 2 in a leftward direction, and it is unnecessary to secure a space for storing the assist unit 50 between the upper part or the front part of the prime mover part 2 and an upper part or a front part of the bonnet 7 at the closed position. Therefore, it is possible to prevent the size of the vehicle body from increasing due to the storage space being secured between the two parts.

Furthermore, when the bonnet 7 is located at the open position, the assist unit 50 can be located at a position at a low level that is close to the left side member 11 and the front lower end part of the bonnet 7. With this configuration, a problem in which the assist unit 50 hinders maintenance to be performed on the prime mover part 2 when the bonnet 7 is located at the open position is unlikely to occur.

As a result, it is possible to improve the maintainability of the prime mover part 2, in particular, the maintainability of the radiator 18, the air cleaner 19, and so on that are arranged in a rear part of the prime mover part 2, without increasing the size of the vehicle body.

The assist unit 50 is provided with, for example: a guide member 52 that is located on a front portion of the vehicle body frame 1, the front portion being located closer to the front cover than the first linkage part 1A is; and a linkage member 53 that spans the guide member 52 and the second linkage part 7A. The guide member 52 is provided with a guide part 52A that guides a third linkage part 53A that is located at one end of the linkage member 53, in the front-rear direction. A rear portion of the linkage member 53, which is located closer to the guide member than a fourth linkage part 53B that is linked with the second linkage part 7A is, is provided with a fifth linkage part 53C. The gas spring 51 spans the first linkage part 1A and the fifth linkage part 53C.

With this configuration, when the bonnet 7 is at the closed position, the gas spring 51 of the assist unit 50 is contracted, and due to this contraction, the third linkage part 53A of the linkage member 53 reaches the rear end of the guide part 52A. Thus, the gas spring 51 and the linkage member 53 are brought into the state where they are orientated in the front-rear direction along the left-side member 11 and are located close to the left side member 11.

When the bonnet 7 is operated to open, the gas spring 51 of the assist unit 50 expands, and due to this expansion, the third linkage part 53A of the linkage member 53 moves forward along the guide part 52A, and the linkage member 53 swings about the third linkage part 53A so as to stand up. Thus, the linkage member 53 pushes the second linkage part 7A of the bonnet 7 forward and upward. Thus, the assist unit 50 can assist the operation to open the bonnet 7.

Thereafter, the third linkage part 53A reaches the front end of the guide part 52A, the gas spring 51 of the assist unit 50 stops expanding, and the linkage member 53 stops swinging in a predetermined forward-lifted position. Thus, the assist unit 50 fixes and holds the bonnet 7 at a predetermined open position.

At this point in time, the linkage member 53 is inclined by a relatively large angle, in the forward-lifted position, in the area on the side of the front end part of the vehicle body frame 1, and the gas spring 51 is inclined in an area on the rear side of the linkage member 53 by an angle that is smaller than the inclination angle of the linkage member 53. Thus, compared to the case in which the gas spring 51 spans the first linkage part 1A and the second linkage part 7A, for example, the forward-lifted inclination angle of the gas spring 51 when the bonnet 7 is located at the open position is small, and the gas spring 51 is located even closer to the left side member 11. With this configuration, a problem in which the assist unit 50 hinders maintenance to be performed on the prime mover part 2 when the bonnet 7 is located at the open position is more unlikely to occur.

Also, it is possible to employ a small gas spring as the gas spring 51, and it is possible to reduce the cost required for the gas spring 51.

As a result, it is possible to improve the maintainability of the prime mover part 2 while reducing cost required for the gas spring 51.

In order to simplify the configuration of the assist unit 50, a rod is employed as the linkage member 53, and a hole that is elongated in the front-rear direction and into which one end part of the rod is inserted is employed as the guide part 52A.

As shown in FIG. 6, the first linkage part 1A is provided with a first through hole 1B and a second through hole 1C that are arranged at a predetermined interval in the front-rear direction, as holes that allow the assist unit to be attached thereto. When the tractor is configured as a standard type tractor without a front loader (not shown), the first through hole 1B on the front side is used as a hole that allows the gas spring 51 to be attached thereto. When the tractor is configured as a loader type tractor provided with a front loader (not shown), the second through hole 1C on the rear side is used as a hole that allows the gas spring 51 to be attached thereto. If the gas spring 51 is attached to the first linkage part 1A by using the first through hole 1B on the front side, the opening angle of the bonnet 7 at the open position will be large, and it will be easy to perform maintenance on the prime mover part 2. If the gas spring 51 is attached to the first linkage part 1A by using the second through hole 1C on the rear side, the opening angle of the bonnet 7 at the open position will be small, and it is possible to prevent the bonnet 7 from coming into contact with the front loader.

As shown in FIG. 6, this tractor is provided with a guide mechanism 54 that guides the operation to open and close the bonnet 7. The guide mechanism 54 is provided with a guide member 55 and a linkage member 56 that respectively have the same configurations as the guide member 52 and the linkage member 53 of the assist unit 50. The guide member 55 is located at a position that is opposite the guide member 52 of the assist unit 50 of the vehicle body frame 1 in terms of the left-right direction. The right side member 11, out of the left and right side members 11 located on lateral end portions of the vehicle body frame 1, is provided with a guide member 55. The bonnet 7 is provided with a sixth linkage part 7B with which the guide mechanism 54 is linked, at a position that is opposite the second linkage part 7A of the bonnet 7 in terms of the left-right direction.

The guide member 55 is provided with a guide part 55A that guides a seventh linkage part 56A that is located at one end of the linkage member 56, in the front-rear direction. The linkage member 56 is provided with an eighth linkage part 56B that is linked with the sixth linkage part 7B.

With this configuration, when the bonnet 7 is operated to open or close, the left and right side parts of the bonnet 7 are guided by the assist unit 50 and the guide mechanism 54 to open or close in a balanced manner. Therefore, it is possible to smoothly perform an operation to open or close the bonnet 7.

In order to simplify the configuration of the guide mechanism 54, a rod is employed as the linkage member 56, and a hole that is elongated in the front-rear direction and into which one end part of the rod is inserted is employed as the guide part 55A.

As shown in FIGS. 1 to 5, the front guard 8 is provided with, for example: left and right first guard members 61 each having a lower end part 61A that is fixed and coupled to the vehicle body frame 1; and a second guard member 62 that is located between the left and right first guard members 61. The left and right first guard members 61 have a left-right distance therebetween that is wider than the bonnet 7 in the left-right direction, so that the bonnet 7 is allowed to be inserted into the interval between the left and right first guard members 61. The second guard member 62 swings in the front-rear direction about a second pivot shaft 63 that is located in the front end part of the vehicle body frame 1 and is orientated in the left-right direction, between a guard position that is located immediately forward of the bonnet 7 at the closed position and a retracted position at which the second guard member 62 allows the bonnet 7 to swing to the open position. Front end parts 61B of the left and right first guard members 61 are located further forward of the vehicle body than a front end part 62A of the second guard member 62 located at the guard position is.

With this configuration, when performing maintenance on the prime mover part 2 or the like that is covered by the bonnet 7, the operator first operates the second guard member 62 so as to swing from the guard position to the retracted position, and then performs an operation to open the bonnet 7. Thus, it is possible to widely swing the bonnet 7 in the opening direction without being restricted by the front guard 8. Therefore, it is possible to widely open an area around the prime mover part 2 that is covered by the bonnet 7, and it is easier to perform maintenance on the prime mover part 2.

When the operator drives the tractor, the bonnet 7 is closed and the second guard member 62 is located at the guard position. Therefore, if the front guard 8 collides with another object, usually the front end parts 61B of the left and right first guard members 61, which are fixed and coupled to the vehicle body frame 1 and have a high supporting strength, collide with the other object. Therefore, it is possible to effectively prevent a problem in which the front guard 8 that has collided with another objet comes into contact with the bonnet 7.

When the front guard 8 collides with another object, the object may enter the gap between the left and right first guard members 61. In such a case, the second guard member 62 collides with the other object and protects the bonnet 7.

As a result, it is possible to reliably protect the bonnet 7 by using the front guard 8 without degrading the maintainability of the prime mover part 2 and so on covered by the bonnet 7.

The front guard 8 is provided with a coupling member 64 that has a left-right width that spans the lower end parts of the left and right first guard members 61 and couples the lower end parts of the left and right first guard members 61 to each other. The coupling member 64 is joined to the front surface of the front end member 12 that constitutes the front end surface of the vehicle body frame 1.

With this configuration, it is possible to improve the strength and the shape retainability of the lower end parts 61A of the left and right first guard members 61. Also, when the front guard 8 collides with another object, it is possible to disperse the collision load over the front end surface of the vehicle body frame 1, and it is possible to prevent stress from concentrating at the position where the lower end parts 61A of the left and right first guard members 61 and the vehicle body frame 1 are coupled to each other.

As a result, it is possible to more reliably protect the bonnet 7 by using the left and right first guard members 61, while improving the durability of the front guard 8.

As shown in FIGS. 2 and 3, the front guard 8 is provided with a coupling mechanism 65 that couples the second guard member 62 at the guard position to the first guard member 61 on the right side.

With this configuration, it is possible to improve the supporting strength of the second guard member 62 at the guard position. With this configuration, if the front guard 8 collides with another object and the object enters the gap between the left and right first guard members 61, the second guard member 62 having an improved supporting strength collides with the other object.

As a result, it is possible to effectively prevent a problem in which the second guard member 62 swings rearward or is deformed due to the collision with the other object and comes into contact with the bonnet 7, and it is possible to more reliably protect the bonnet 7 by using the second guard member 62.

The coupling mechanism 65 is provided with, for example: a coupling pin 66 that is orientated in the left-right direction and is supported on the right side portion of a free end part of the second guard member 62 so as to be able to operate to protrude and retract in the left-right direction; and a compression spring 67 that biases the coupling pin 66 such that the coupling pin 66 protrudes leftward. An upper part of the first guard member 61 on the right side is provided with a through hole (not shown) that allows the coupling pin 66 to be inserted therein.

When the second guard member 62 is located at the guard position, a right end part of the coupling pin 66 of the coupling mechanism 65 protrudes rightward to the outside of the second guard member 62 due to the effect of the compression spring 67, and is inserted into the through hole in the first guard member 61. Thus, the second guard member 62 at the guard position is coupled to the first guard member 61 on the right side.

When the second guard member 62 is at the guard position, the coupling pin 66 of the coupling mechanism 65 is operated to retract leftward opposing the effect of the compression spring 67, and the right end part of the coupling pin 66 is removed from the through hole of the first guard member 61. Thus, the second guard member 62 at the guard position and the first guard member 61 on the right side are decoupled from each other.

In other words, the coupling mechanism 65 can easily switch the state of the second guard member 62 at the guard position to the coupled state in which the second guard member 62 is coupled to the first guard member 61 on the right side and to a decoupled state in which the second guard member 62 is decoupled from the first guard member 61 by performing an operation to cause the coupling pin 66 to protrude or retract.

Other Embodiments Modified from First Embodiment

The present invention is not limited to the configuration described as an example in the first embodiment above. The following describes other representative embodiments modified from the first embodiment.

1-1. The work vehicle may be configured such that the prime mover part 2 and the bonnet 7 are provided in the rear part of the vehicle body frame 1.

1-2. The work vehicle may be configured without the front guard 8.

1-3. The configuration of the prime mover part 2 may be variously modified. For example, the prime mover part 2 may be configured with an air-cooled type engine 15, an exhaust processing apparatus having a diesel particulate filter (DPF), or the like. Also, the prime mover part 2 may be a hybrid prime mover part that includes the engine 15 and an electric motor.

1-4. The configuration of the bonnet 7 in which the end cover 25, the left and right side covers 26, and the upper cover 27 are joined to each other may be variously modified. For example, in the bonnet 7, the left and right side covers 26 and the upper cover 27 may be joined to each other by using bolts. Alternatively, in the bonnet 7, the end cover 25 may be joined to the left and right side covers 26 and the upper cover 27 by welding.

1-5. The assist unit 50 may be provided outside the prime mover part 2 in a rightward direction, and two assist units 50 may be provided outside the prime mover part 2 in a leftward direction and outside the prime mover part 2 in a rightward direction.

1-6. The assist unit 50 may be configured such that the expansion/contraction mechanism 51 spans the first linkage part 1A of the vehicle body frame 1 and the second linkage part 7A of the bonnet 7.

1-7. The first linkage part 1A of the vehicle body frame 1 may have a single through hole 1B as a hole that allows the assist unit to be attached thereto, or three or more through holes arranged in the front-rear direction at predetermined intervals.

1-8. If the first linkage part 1A of the vehicle body frame 1 has a single through hole 1B as a hole that allows the assist unit to be attached thereto, the second linkage part 7A of the bonnet 7 may have a plurality of through holes that allow the assist unit to be attached thereto, arranged at predetermined intervals.

1-9. The expansion/contraction mechanism 51 may be, for example, of a coil spring type in which a piston rod is fitted into a cylinder tube so as to be able to protrude and retract, and the piston rod is biased by a coil spring in the cylinder tube so as to protrude.

1-10. The guide member 52 may be provided with, as the guide part 52A, a groove that is elongated in the front-rear direction, for example.

1-11. The linkage member 53 may be, for example, a steel strip that is provided with the third linkage part 53A, the fourth linkage part 53B, and the fifth linkage part 53C.

1-12. The linkage member 53 may be, for example, configured such that one end part of the linkage member 53 is provided with the fourth linkage part 53B that is linked with the second linkage part 7A of the bonnet 7, the other end part of the linkage member 53 is provided with the fifth linkage part 53C with which the expansion/contraction mechanism 51 is linked, and the third linkage part 53A that is guided by the guide member 52 is provided between the fourth linkage part 53B and the fifth linkage part 53C.

1-13. The work vehicle is not limited to a tractor, and may be, for example, a mid-mount mower, a front mower, or a front loader.

Second Embodiment

The following describes, as an example of a mode for carrying out the present invention, a second embodiment in which the present invention is applied to a tractor that is an example of a work vehicle with reference to the drawings.

Figure 14:
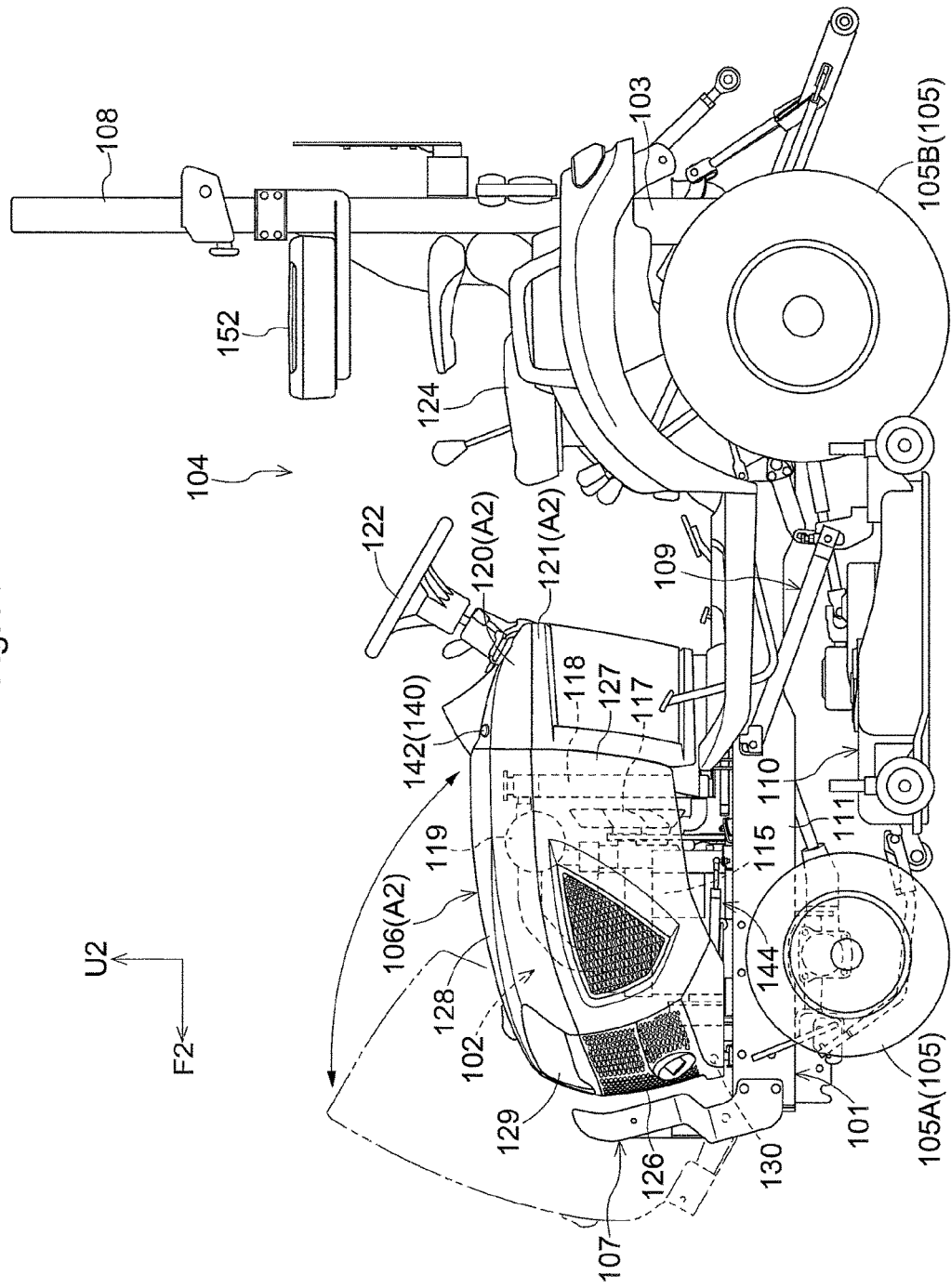
FIG. 14 shows a second embodiment, and is a left-side view of a tractor.

Note that the direction indicated by the arrow with a mark F2 shown in FIG. 14 is the forward direction of the tractor, and the direction indicated by the arrow with a mark U2 is the upward direction of the tractor.

Figure 15:
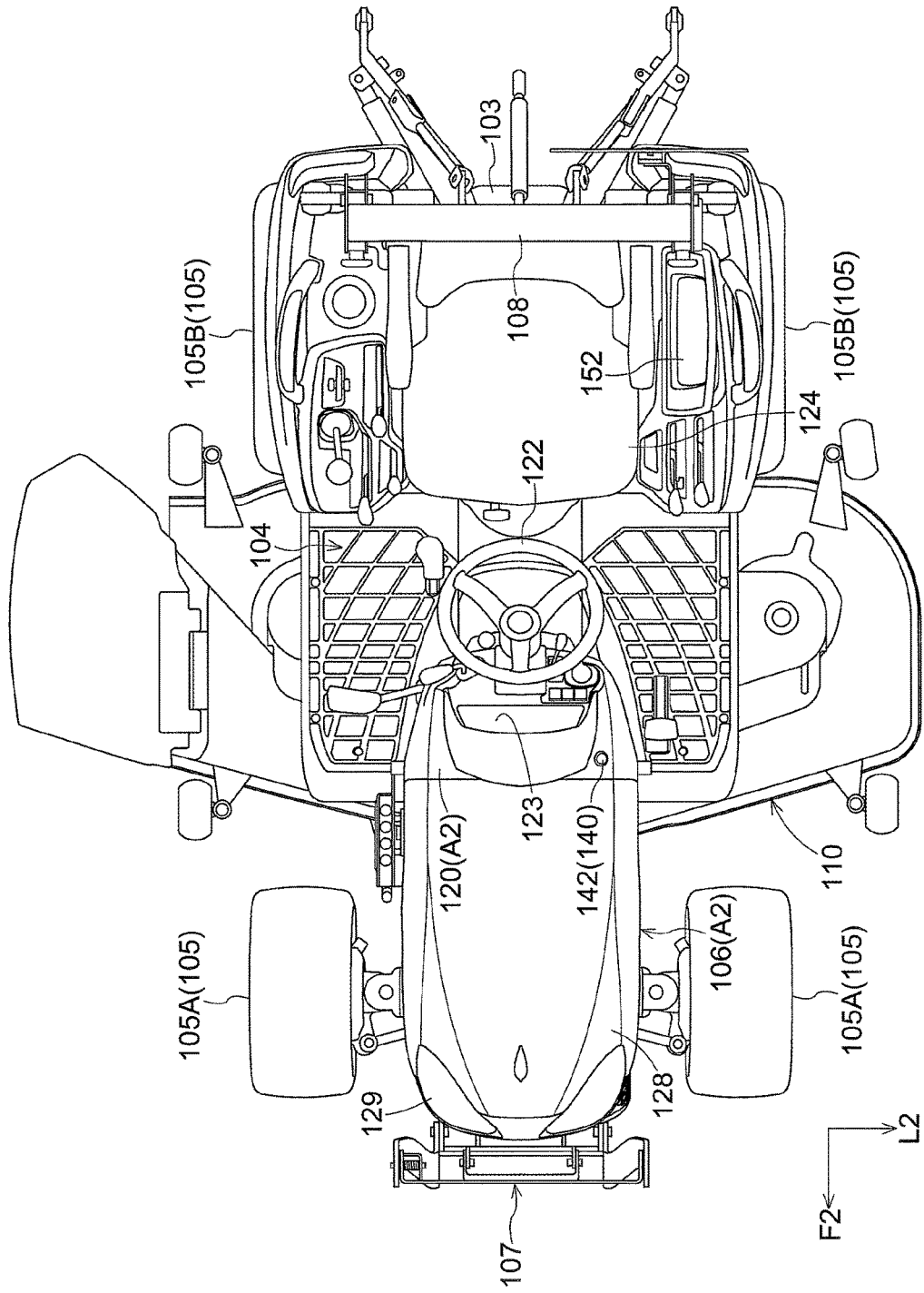
FIG. 15 shows the second embodiment, and is a plan view of the tractor.

The direction indicated by the arrow with the mark F2 shown in FIG. 15 is the forward direction of the tractor, and the direction indicated by the arrow with a mark L2 is the leftward direction of the tractor.

As shown in FIGS. 14 and 15, the tractor described in the second embodiment as an example is provided with, for example: a vehicle body frame 101 that constitutes the framework of a vehicle body; a prime mover part 102 that is located on the front part side of the vehicle body frame 101; a transmission unit 103 that is coupled to a rear part of the vehicle body frame 101; a driving part 104 of a boarding type that is located above the rear part of the vehicle body frame 101; left and right travelling apparatuses 105; a bonnet 106 that opens and closes by swinging, and covers the prime mover part 102; a front guard 107 that is made from a steel plate, and is located immediately forward of the bonnet 106 to protect the bonnet 106 and so on; a protection frame 108 that is coupled to a rear end part of the vehicle body frame 101; and a mower 110 that is coupled to the vehicle body frame 101 with a link mechanism 109 interposed therebetween, so as to be able to be raised and lowered. The tractor is configured as a four-wheel drive type tractor provided with, as the left and right travelling apparatuses 105: left and right front wheels 105A that are steerable and are driven by a driving force from the prime mover part 102; and left and right rear wheels 105B that are steerable and are driven by a driving force from the prime mover part 102. Also, the tractor is configured as a midmount type tractor in which the mower 110 is located on an underbody between the left and right front wheels 105A and the left and right rear wheels 105B.

Figure 16:
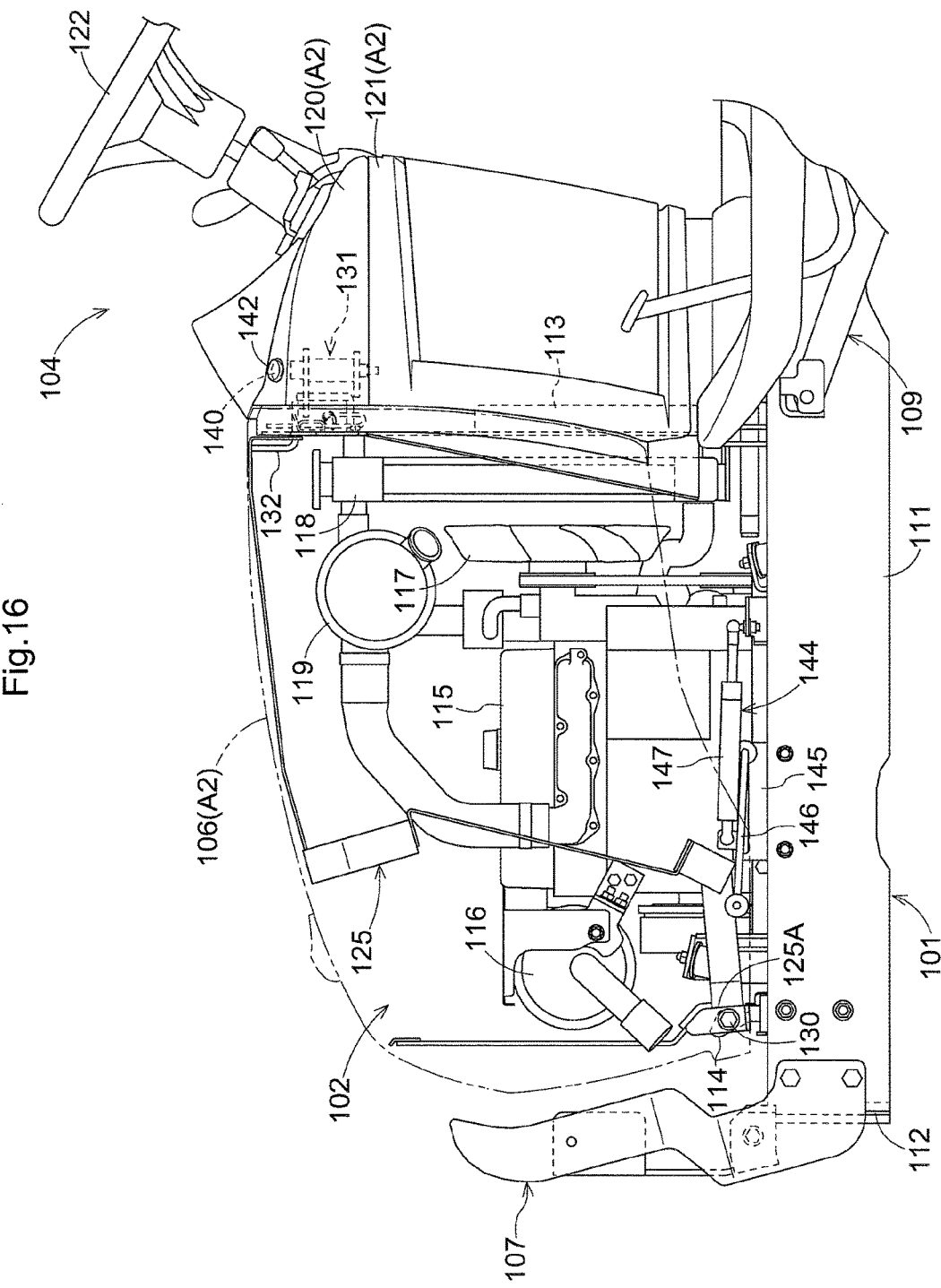
FIG. 16 shows the second embodiment, and is a vertical cross-sectional left side view of a main part, showing a situation in which a bonnet is located at a closed position.
Figure 17:
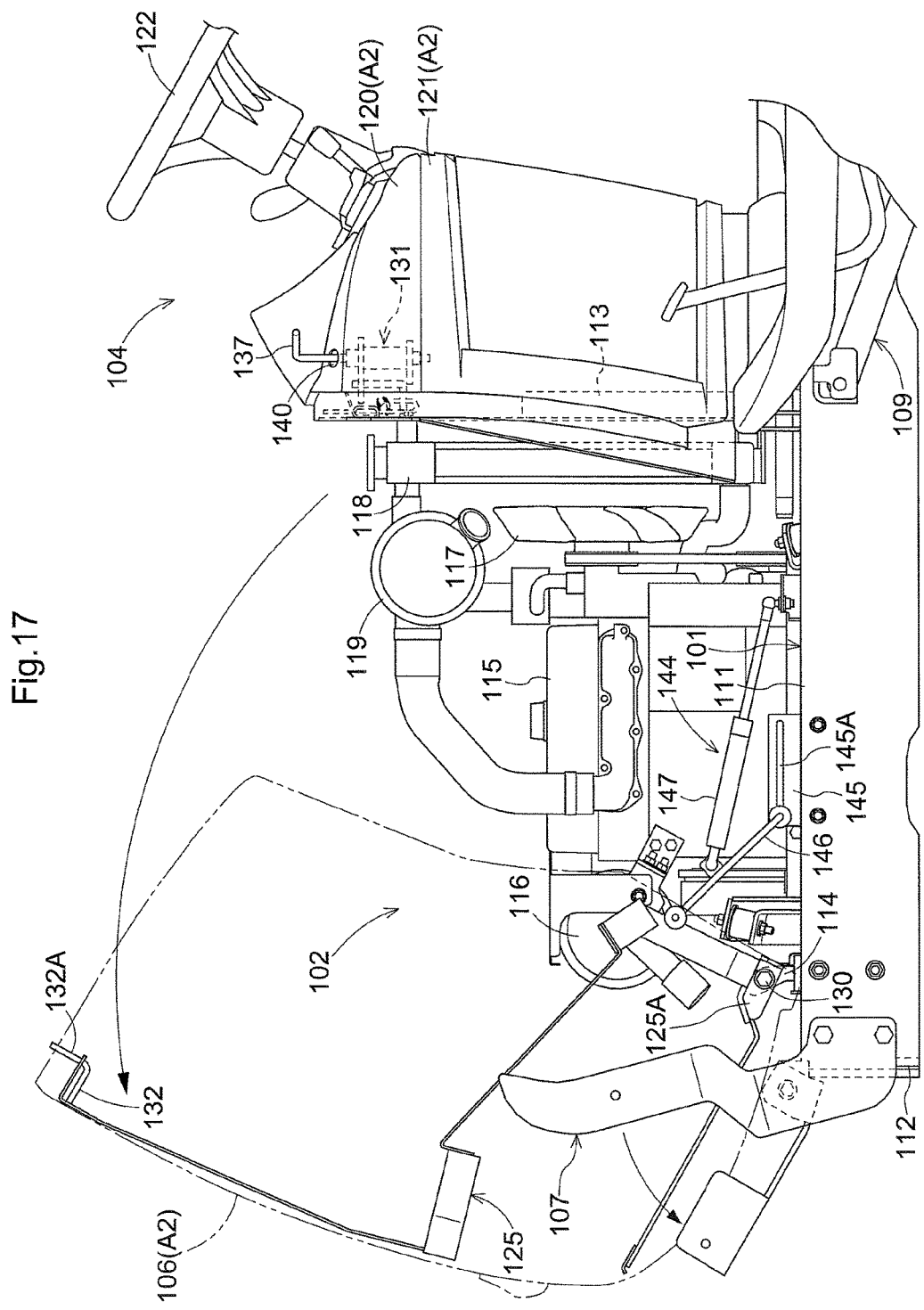
FIG. 17 shows the second embodiment, and is a vertical cross-sectional left side view of the main part, showing a situation in which the bonnet is located at an open position.

As shown in FIGS. 14, 16, and 17, the vehicle body frame 101 is provided with, for example: left and right side members 111 that are made from steel plates and are elongated in the front-rear direction; a front end member 112 that is made from a steel plate and spans the front ends of the left and right side members 111; a center pillar 113 that is coupled to central parts, in the front-rear direction, of the left and right side members 111; and left and right bonnet-coupling brackets 114 that are coupled to front end parts of the left and right side members 111.

As shown in FIGS. 14 to 18, the prime mover part 102 is provided with, for example: a water-cooled type engine 115 that is supported by the front part of the vehicle body frame 101 so as to be vibration-proof; a muffler 116 that is located immediately forward of the engine 115 and is orientated in the left-right direction; a cooling fan 117 that is located immediately rearward of the engine 115; a radiator 118 that is located rearward of the cooling fan 117; and an air cleaner 119 that is located above the engine 115. In the prime mover part 102, the front part side is covered by the bonnet 106, the upper part side of the rear end part is covered by an upper panel 120, and the lower part side of the rear end part is covered by an under panel 121. In other words, the bonnet 106, the upper panel 120, and the under panel 121 constitute a cover unit A2 that covers substantially the entirety of the prime mover part 102.

The driving part 104 is provided with, for example: a steering wheel 122 for steering the front wheels; a display panel 123 that displays, for example, the number of revolutions of the engine; and an operation seat 124 that is located above the transmission unit 103.

The bonnet 106 is an integrated member in which, for example: a bonnet frame 125 that is made from a steel plate and that constitutes the framework of the bonnet 106; a front cover 126 that covers the front end part of the prime mover part 102; left and right side covers 127 that cover lateral side parts of the prime mover part 102; an upper cover 128 that covers the upper part of the prime mover part 102; and a headlight unit 129 are coupled integrally with each other. The bonnet 106 opens and closes by swinging about shafts 130 that are located in the front end part of the vehicle body frame 101 and is orientated in the left-right direction. A lower end portion of the front end part of the bonnet frame 125 is provided with left and right coupling parts 125A. The left and right coupling parts 125A are coupled to the left and right brackets 114 of the vehicle body frame 101 with left and right bolts 130 that serve as the shafts 130 orientated in the left-right direction being interposed therebetween.

Thus, the bonnet 106 is configured as a rear-open type bonnet that is configured to swing in the top-bottom direction between a closed position below and an open position above relative to a vehicle body frame 101, and that widely opens the rear part side of the prime mover part 102 when located at the open position. As a result, it is easier to perform maintenance on the radiator 118, the air cleaner 119, and so on located on the rear part side of the prime mover part 102.

As shown in FIGS. 16 to 21, this tractor is provided with a lock mechanism 131 that fixes and holds the bonnet 106 at the closed position located downward. The lock mechanism 131 is provided with: a lock unit 131A that fixes and holds the bonnet 106 at the closed position in conjunction with the bonnet 106 that is operated to swing to the closed position; and an unlock unit 131B that allows for an operation to unlock the bonnet 106 that has been fixed and held at the closed position by the lock unit 131A.

The lock unit 131A is provided with: an L-shaped fixed rod 132 (an example of the fixed member) that is fixed to the bonnet frame 125 of the bonnet 106; a movable member 133 that is provided on the center pillar 113 of the vehicle body frame 101 and is configured to swing between the lock position and the unlock position; and an extension spring 134 (an example of the biasing member) that biases the movable member 133 such that the movable member 133 returns to the lock position.

The fixed rod 132, which has a catch part 132A that is orientated in the front-rear direction, is located on a rear end part of the center of the bonnet 106 in the left-right direction. The intermediate part side of the movable member 133 is attached to the central part, in the left-right direction, of a support member 136 that is fixed to an upper part of the center pillar 113 by using, for example, a bolt 135 that is orientated in the front-rear direction and serves as the pivot of swing of the movable member 133. The orientation of the movable member 133 is set such that the movable member 133 is orientated in a vertical direction when located at the lock position and in a rightward-inclined position when at the unlock position. An upper part of the movable member 133 is provided with a hook part 133A that catches on the catch part 132A of the fixed rod 132 by being located at the lock position when the bonnet 106 is located at the closed position. A lower part of the movable member 133 is provided with a force receiver part 133B that receives an unlock operation force from the unlock unit 131B. The hook part 133A is provided with a cam part 133C that allows the catch part 132A of the fixed rod 132 to be operated to swing to the unlock position. The extension spring 134 spans a right end part of the support member 136 and the force receiver part side of the movable member 133.

A central portion, in the left-right direction, of the upper part of the center pillar 113 is provided with a recessed part 113A that allows the catch part 132A to be inserted or removed when the bonnet 106 is operated to swing. The hook part 133A of the lock position is located adjacent to and behind the central portion of the upper part. A central portion, in the left-right direction, of the upper panel 120 is provided with a recessed part 120A that allows the catch part 132A to pass therethrough when the bonnet 106 is operated to swing. The recessed part 113A of the center pillar 113 is located adjacent to and below the central portion of the upper part.

With the above-described configuration, when the user such as a driver operates the bonnet 106 so as to swing to the closed position, the catch part 132A on the bonnet side passes through the recessed part 120A of the upper panel 120, is inserted into the recessed part 113A of the center pillar 113, and comes into contact with the cam part 133C of the movable member 133. Then, due to this contact, the movable member 133 swings and retracts from the lock position to the unlock position opposing the effect of the extension spring 134. Thereafter, as the bonnet 106 approaches the closed position, the catch part 132A moves to a position below the cam part 133C, and accordingly the movable member 133 returns to the lock position due to the effect of the extension spring 134, and the hook part 133A catches on the catch part 132A.

In other words, the user such as a driver can fix and hold the bonnet 106 at the closed position using the effect of the lock mechanism 131 with a simple operation to operate the bonnet 106 so as to swing to the closed position.

The unlock unit 131B is provided with, for example: an L-shaped operation rod 137 (an example of the operation member) that allows the movable member 133 to be operated to the unlock position opposing the effect of the extension spring 134; a shaft-shaped rotation member 138 that is supported by the center pillar 113, and is configured to rotate about a vertical axis; and a linkage rod 139 (an example of the linkage member) that spans the rotation member 138 and the movable member 133. The operation rod 137 is of a detachable type that has an insertion part 137A that can be inserted into or removed from a through hole 140 that is formed in a left-side front end part of the upper panel 120. The insertion part 137A of the operation rod 137 is provided with an operation part 137B that transmits an unlock operation force to the force receiver part 133B of the movable member 133 via the rotation member 138 and the linkage rod 139 when the insertion part 137A is in an in-use state in which the insertion part 137A has been inserted into the through hole 140 of the upper panel 120. The rotation center of the rotation member 138 faces the through hole 140 of the upper panel 120, and an upper end portion of the rotation member 138 that faces the through hole 140 is provided with a coupling part 138A to which the operation part 137B of the operation rod 137 is coupled so as to be rotatable integrally with the coupling part 138A.

With the above-described configuration, when the user such as a driver releases the bonnet 106 from the closed position at which the bonnet 106 is fixed and held, the user inserts the insertion part 137A of the operation rod 137 into the through hole 140 of the upper panel 120, couples the operation part 137B of the operation rod 137 to the coupling part 138A of the rotation member 138, and then rotates the rotation member 138 together with the operation rod 137 about a vertical axis. Thus, an unlock operation force can be transmitted to the force receiver part 133B of the movable member 133, and the movable member 133 is operated so as to swing from the lock position to the unlock position opposing the effect of the extension spring 134. Using this swing movement, it is possible to release the bonnet 106 from the closed position at which the bonnet 106 is fixed and held by the lock mechanism 131.

In other words, the user such as a driver can easily release the bonnet 106 from the closed position at which the bonnet 106 is fixed and held by the lock mechanism 131 with a simple operation to insert the operation rod 137 into the through hole 140 to couple the operation rod 137 to the rotation member 138 and rotate the rotation member 138 together with the operation rod 137.

It is also possible to prevent a third person who does not own the operation rod 137 and does not know how to use the operation rod 137 from releasing the bonnet 106 from the closed position at which the bonnet 106 is fixed and held by the lock mechanism 131.

The coupling part 138A is formed on a large-diameter head part 138B of the rotation member 138, and a vertically elongated shaft part 138C that has a smaller diameter than the head part 138B is rotatably supported on a boss part 113B that is provided on a left side top part of the center pillar 113. An anti-separation nut 141 is attached to a male screw part 138D that is formed on a lower end part of the rotation member 138. Also, an arm part 138E that is fixed to the head part 138B is coupled to the force receiver part 133B of the movable member 133 via the linkage rod 139 so as to be movable in conjunction with the force receiver part 133B.

Figure 20:
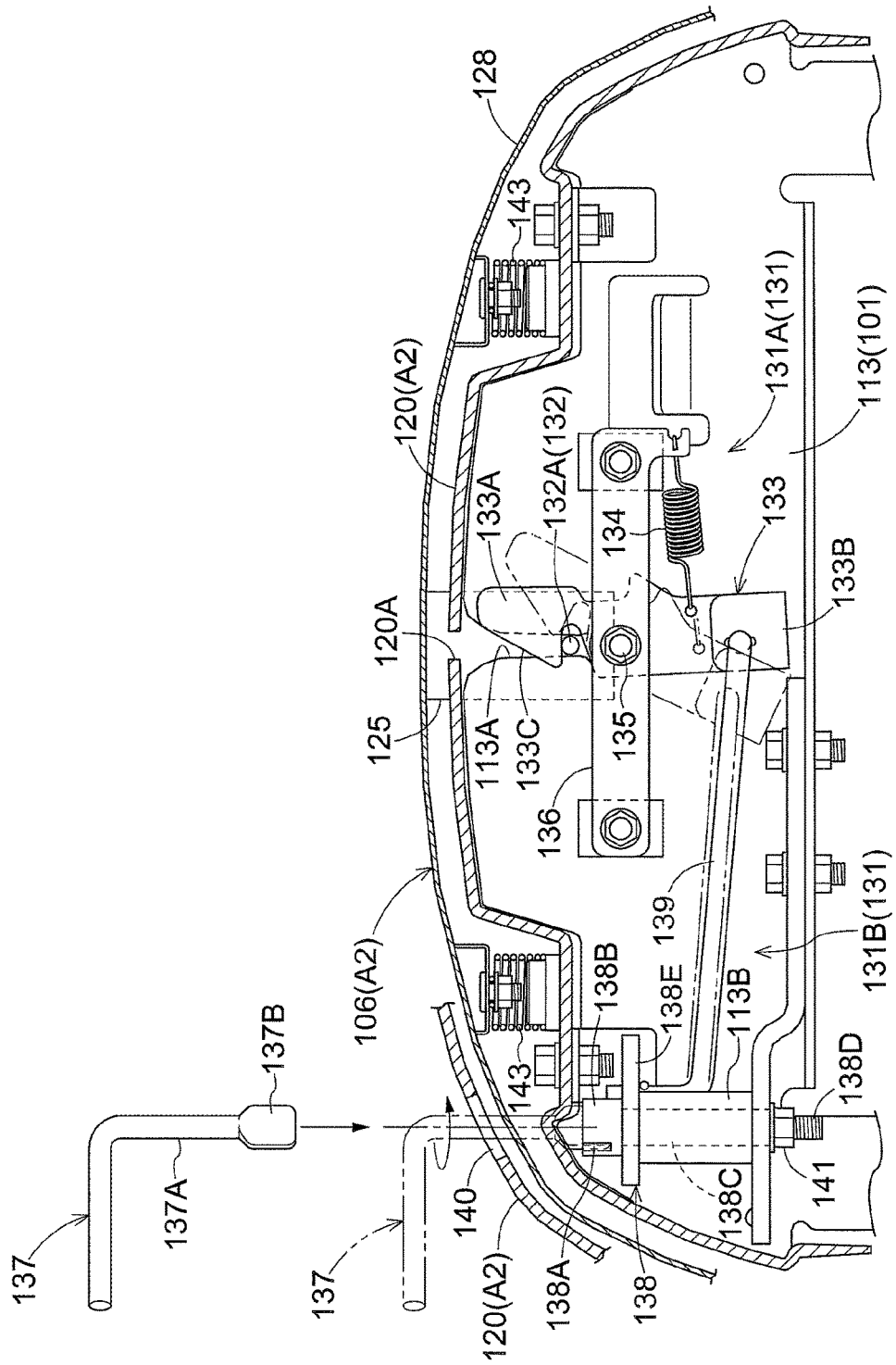
FIG. 20 shows the second embodiment, and is a vertical cross-sectional rear view of the main part, showing a situation in which the bonnet has been fixed and held by the lock mechanism, and a situation in which the bonnet is unfixed.
Figure 21:
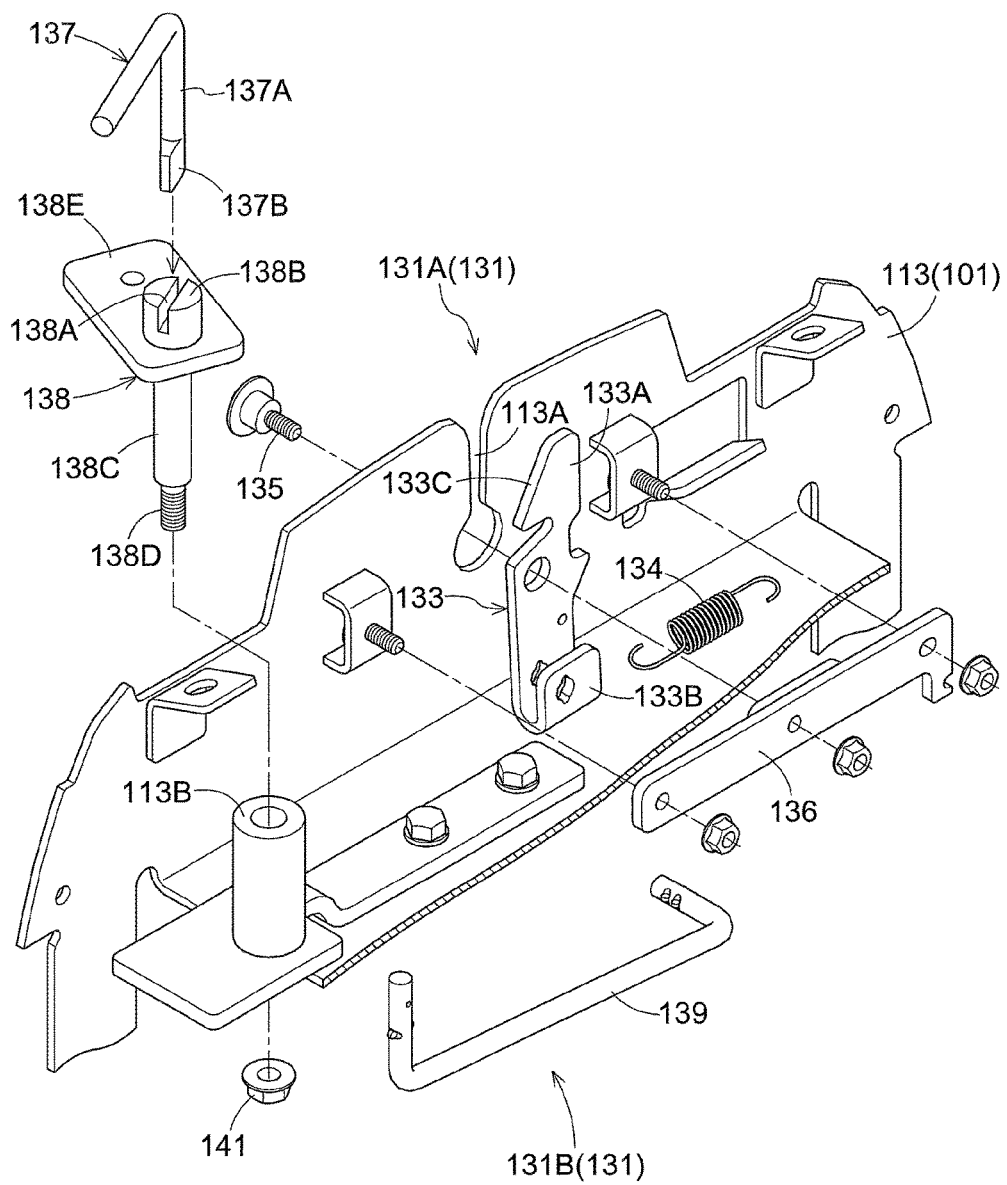
FIG. 21 shows the second embodiment, and is an exploded perspective view of the main part, showing a configuration of the lock mechanism.

As shown in FIG. 20 and FIG. 21, the coupling part 138A of the rotation member 138 is formed as a groove-like part in a straight line-shape that passes through the rotation center of the rotation member 138 so as to reach the outer periphery of the rotation member 138. The operation part 137B of the operation rod 137 is formed as a protruding part that is formed in a straight-line shaped so as to be fitted into the coupling part 138A that is formed as a groove-like part.

With the above-described configuration, a rod having a simple shape with the operation part 137B formed as a protruding part may be employed as the operation rod 137. Consequently, it is possible to reduce the cost required for the lock mechanism 131.

Also, it is possible to prevent rainwater or washing water from being retained by the coupling part 138A of the rotation member 138, and it is possible to prevent the coupling part 138A from rusting due to rainwater or the like being retained.

As shown in FIGS. 14 to 20, a rubber cap 142 that closes the through hole 140 is detachably attached to the upper panel 120. In other words, it is possible to release the bonnet 106 from the closed position at which the bonnet 106 is fixed and held by the lock mechanism 131, by removing the cap 142 from the upper panel 120.

Figure 18:
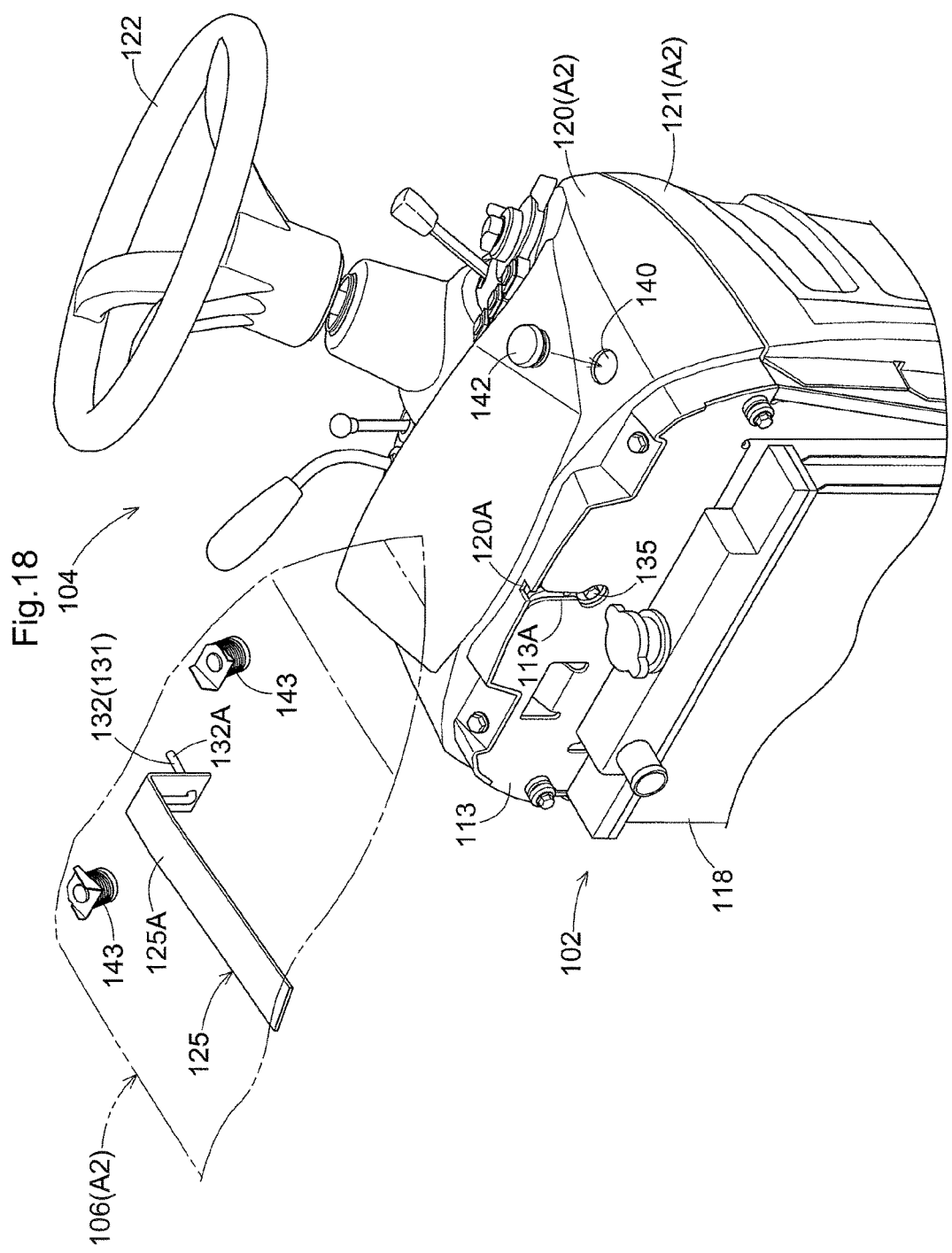
FIG. 18 shows the second embodiment, and is a perspective view of the main part, showing a configuration for, for example, fixing and holding the bonnet.
Figure 19:
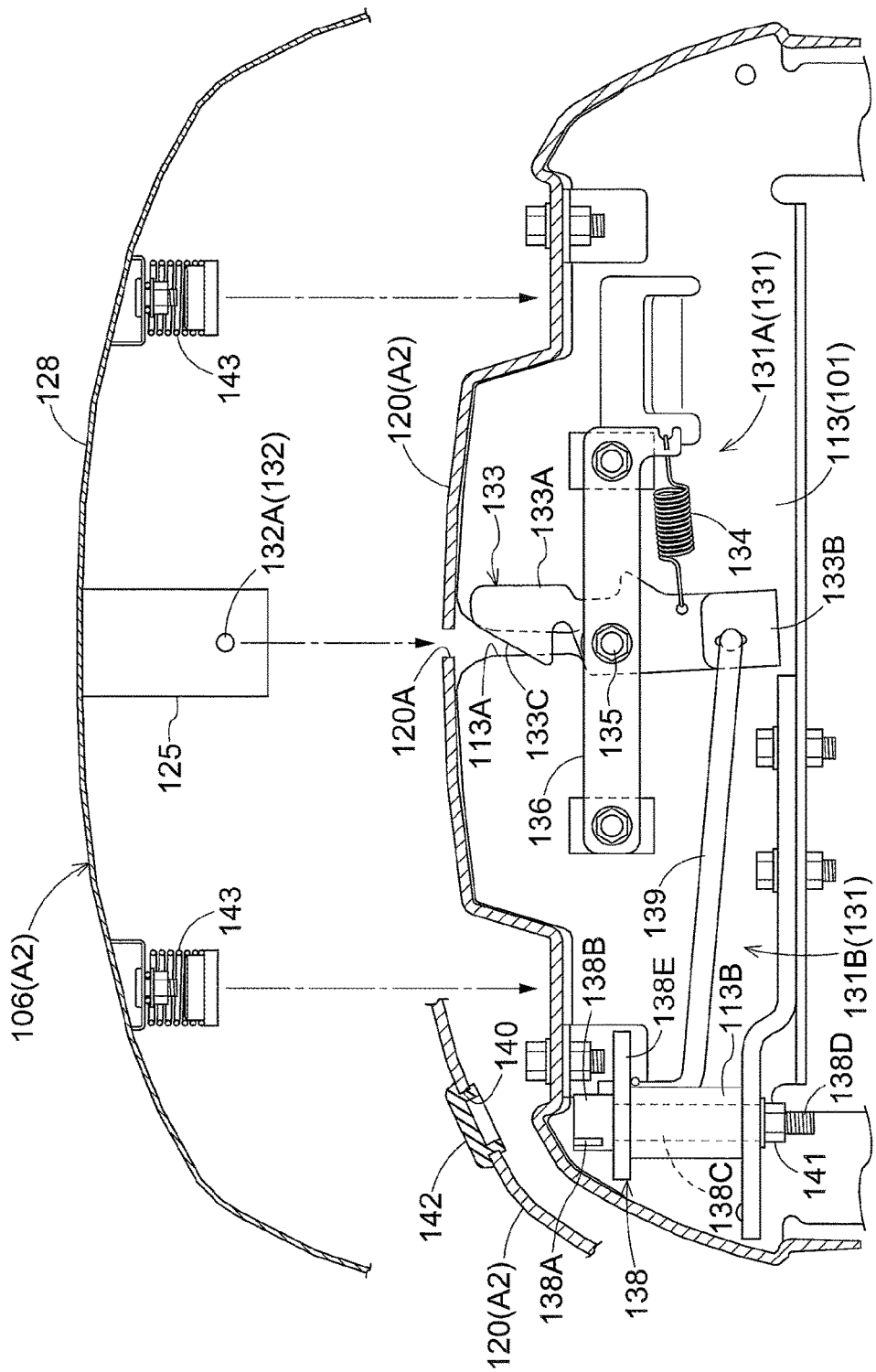
FIG. 19 shows the second embodiment, and is a vertical cross-sectional rear view of the main part, showing a situation in which the bonnet is not fixed or held by a lock mechanism.

As shown in FIGS. 18 to 20, the bonnet 106 is provided with left and right compression springs 143 that are received and supported by the center pillar 113 with the upper panel 120 being interposed therebetween. The left and right compression springs 143 raise the bonnet 106 upward from the closed position upon the bonnet 106 being released from the closed position at which the bonnet 106 is fixed and held by the lock mechanism 131, and receive and hold the bonnet 106 at an unlock position that is located slightly above the closed position. The left and right compression springs 143 allow the bonnet 106 to swing and shift to the closed position when the bonnet 106 is operated to swing downward opposing the effect of the left and right compression springs 143.

As a result, it is possible to prevent a problem in which the bonnet 106 becomes fixed and held again at the closed position by the lock mechanism 131 when the movable member 133 returns to the lock position after the unlocking operation has been performed, due to the bonnet 106 being located at the closed position after the unlocking operation of the lock mechanism 131 has been performed. Also, in a situation where the bonnet 106 is fixed and held at the closed position, it is possible to prevent a problem in which a rear end part of the bonnet 106 rattles.

As shown in FIGS. 14, 16, and 17, this tractor is provided with an assist unit 144 that assists the operation to open the bonnet 106. The assist unit 144 is provided with, for example: a guide member 145 that has a guide hole 145A orientated in the front-rear direction, and is fixed to the vehicle body frame 101; a linkage rod 146 that spans the guide member 145 and the bonnet frame 125; and a gas spring 147 that spans the linkage rod 146 and the vehicle body frame 101. The assist unit 144 is configured to assist the operation to open the bonnet 106 by using the gas spring 147 that operates to expand.

With this configuration, due to the effect of the assist unit 144, the user such as a driver can easily open and close the heavy bonnet 106 into which the front cover 126, the left and right side covers 127, and so on are integrated, and that opens and closes by swinging.

As shown in FIGS. 14 and 15, a tool box 152 is attached to a left side frame portion of the protection frame 108. With this configuration, the operation rod 137 of the lock mechanism 131 can be stored in the tool box 152 during driving.

Other Embodiments Modified from Second Embodiment

The present invention is not limited to the configuration described as an example in the second embodiment above. The following describes other representative embodiments modified from the second embodiment.

2-1. The following configurations may be employed in the work vehicle.

For example, the work vehicle may be configured as a semi-crawler vehicle that is provided with left and right crawlers instead of the left and right rear wheels 105B.

For example, the work vehicle may be configured as a full crawler work vehicle that is provided with left and right crawlers instead of the left and right front wheels 105A and the left and right rear wheels 105B.

For example, the work vehicle may be provided with an air-cooled type engine 115.

For example, the work vehicle may be configured as an electrical work vehicle that is provided with an electrical motor instead of the engine 115.

For example, the work vehicle may be configured as a hybrid work vehicle that is provided with the engine 115 and an electrical motor.

For example, the work vehicle may be provided with an exhaust processing apparatus having a diesel particulate filter (DPF).

For example, the work vehicle may be configured such that the bonnet 106 is provided on the rear part side of the vehicle body frame 101.

For example, the work vehicle may be configured without the front guard 107.

2-2. The configuration of the bonnet 106 may be variously modified.

For example, the bonnet 106 may be a front-open type bonnet that widely opens the front part side of the prime mover part 102 when located at the open position.

For example, the bonnet 106 may be configured as an integrated member in which components other than the left and right side covers 127, namely the bonnet frame 125, the front cover 126, the upper cover 128, the headlight unit 129, and so on are coupled integrally with each other and swing in the top-bottom direction with the left-right side covers 127 being left behind.

For example, the bonnet 106 may be configured such that only the upper cover 128 swings in the top-bottom direction.

Figure 22:
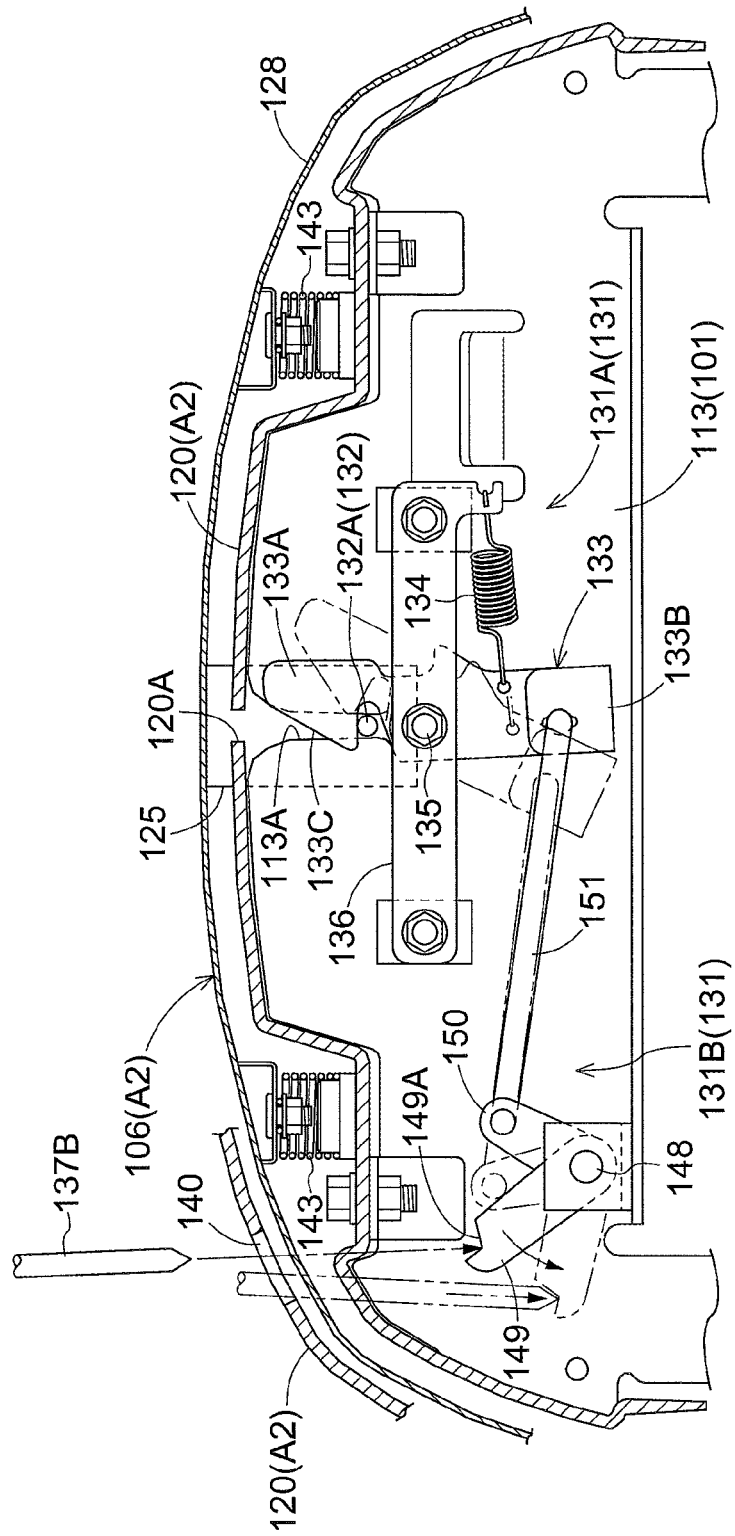
FIG. 22 shows another embodiment modified from the second embodiment, and is a vertical cross-sectional rear view of the main part, showing a situation in which the bonnet has been fixed and held by the lock mechanism, and a situation in which the bonnet is unfixed.
Figure 23:
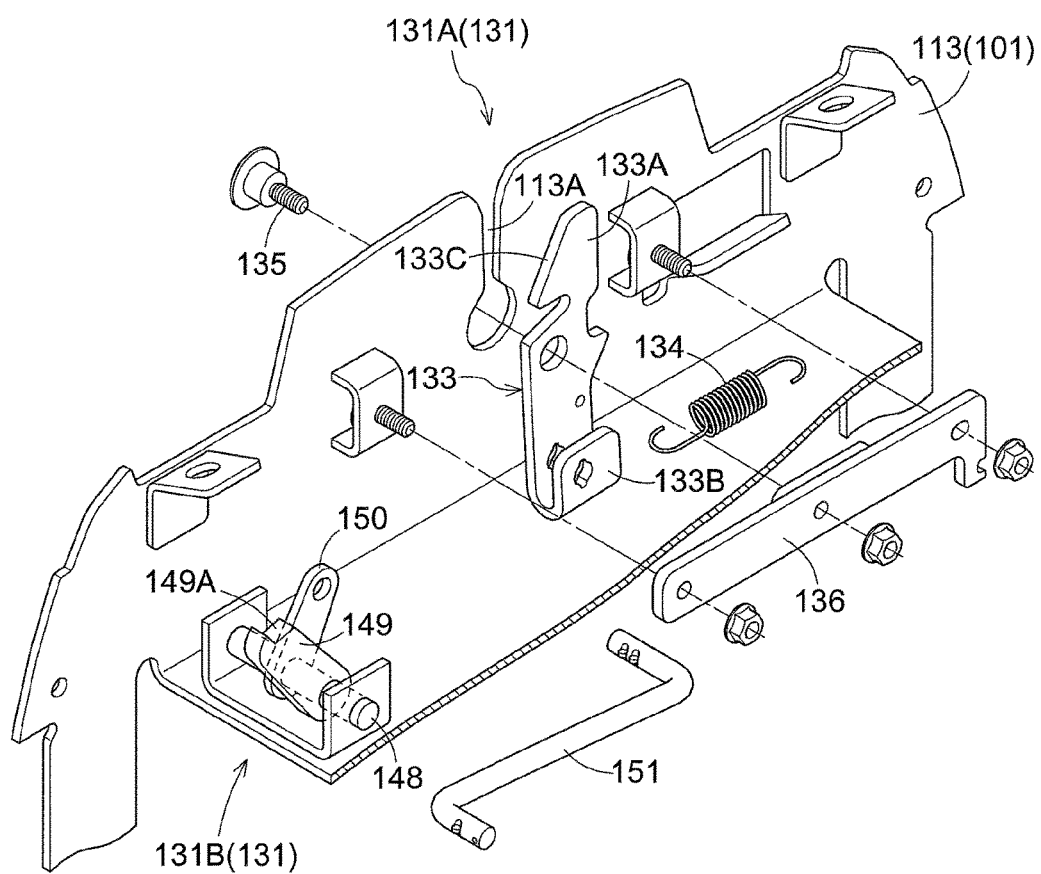
FIG. 23 shows the other embodiment modified from the second embodiment, and is an exploded perspective view of the main part, showing a configuration of the lock mechanism.

2-3. The configuration shown in FIGS. 22 and 23 may be employed for the lock mechanism 131.

In this configuration, the lock mechanism 131 is provided with: a swinging member 149 that is supported by the center pillar 113, with a rotation shaft 148 orientated in the front-rear direction being interposed therebetween, and is configured to swing in the left-right direction; a linkage arm 150 that swings integrally with the swinging member 149 about the rotation shaft 148; and a linkage rod (an example of the linkage member) 151 that spans the linkage arm 150 and the force receiver part 133B of the movable member 133.

The swinging member 149 is provided with a recessed part (an example of the operation-target part) 149A that faces the through hole 140 of the upper panel 120, and allows the operation part 137B of the operation rod (an example of the operation member) 137 to operate to press the swinging member 149.

With the above-described configuration, when the user such as a driver releases the bonnet 106 from the closed position at which the bonnet 106 is fixed and held, the user inserts the insertion part 137A of the operation rod 137 into the through hole 140 of the upper panel 120, and operates the operation part 137B of the operation rod 137 to press the recessed part 149A of the swinging member 149. Thus, an unlock operation force can be transmitted to the force receiver part 133B of the movable member 133, and the movable member 133 can be operated so as to swing from the lock position to the unlock position opposing the effect of the extension spring 134. Using this swing movement, it is possible to release the bonnet 106 from the closed position at which the bonnet 106 is fixed and held by the lock mechanism 131.

In other words, the user such as a driver can easily release the bonnet 106 from the closed position at which the bonnet 106 is fixed and held by the lock mechanism 131 with a simple operation to insert the operation rod 137 into the through hole 140 and press the recessed part 149A of the swinging member 149.

It is also possible to prevent a third person who does not own the operation rod 137 and does not know how to use the operation rod 137 from releasing the bonnet 106 from the closed position at which the bonnet 106 is fixed and held by the lock mechanism 131.

2-4. The position of the lock mechanism 131 may be variously modified depending on the position of the pivot of swing of the bonnet 106, the configuration of the bonnet 106, or the like.

For example, if the bonnet 106 is of a front-open type in which the entirety of the bonnet 106 swings in the top-bottom direction, the lock mechanism 131 may be located in the vicinity of a lower part of the front end of the bonnet 106 that is located at the closed position.

For example, if the bonnet 106 is of a front-open type in which only the upper cover 128 swings in the top-bottom direction, the lock mechanism 131 may be located in the vicinity of an upper part of the front end of the bonnet 106 that is located at the closed position.

2-5. The configuration of the lock mechanism 131 may be variously modified.

For example, the lock mechanism 131 may be configured such that the force receiver part 133B of the movable member 133 is directly operated by the operation part 137B of the operation member 137.

For example, the lock mechanism 131 may be configured such that the fixed member 132 is fixed to the vehicle body frame 101 and the movable member 133 provided on the bonnet 106 so as to be movable.

For example, the lock mechanism 131 may be provided with the fixed member 132 that is U-shaped, straight line-shaped, or the like.

For example, the lock mechanism 131 may be provided with the fixed member 132 for which a steel tube member, a steel strip member, or the like is employed.

For example, the lock mechanism 131 may be provided with the movable member 133 that swings in the top-bottom direction between the lock position and the unlock position.

For example, the lock mechanism 131 may be provided with the movable member 133 that slides between the lock position and the unlock position.

For example, the lock mechanism 131 may be provided with the biasing member 134 for which a torsion spring, a compression spring, or the like is employed.

For example, the lock mechanism 131 may be provided with the operation member 137 that is T-shaped, straight line-shaped, or the like.

For example, the lock mechanism 131 may be provided with the operation member 137 for which a steel tube member, a steel strip member, or the like is employed.

For example, the lock mechanism 131 may be provided with, as the operation member 137, a common tool such as a driver, a hexagonal wrench, a socket wrench, or the like, or an ignition key or the like.

For example, the lock mechanism 131 may be provided with the linkage member 139 or the linkage member 151 for which a steel tube member, a steel strip member, or the like is employed.

For example, the lock mechanism 131 may be provided with the swinging member 149 that swings in the top-bottom direction or the front-rear direction.

For example, the lock mechanism 131 may be provided with the rotation member 138 that rotates about a lateral axis that is orientated in the left-right direction or the front-rear direction.

For example, the lock mechanism 131 may be provided with the rotation member 138 that has a cylindrical shape.

2-6. The shape of the operation part 137B of the operation member 137 and the shape of the coupling part 138A of the rotation member 138 may be variously modified.

For example, the coupling part 138A may be configured as a straight line-shaped protruding part, and the operation part 137B may be configured as a straight line-shaped groove-like part that can be fitted onto the protruding part.

For example, the coupling part 138A may be configured as a rectangular shaft part that is argyle-shaped, square-shaped, hexagon-shaped, or the like, and the operation part 137B may be configured as a rectangular hole part that can be fitted onto the rectangular shaft part.

For example, the coupling part 138A may be configured as an elliptic shaft part, and the operation part 137B may be configured as an elliptic hole part that can be fitted onto the elliptic shaft part.

For example, the coupling part 138A may be configured as a rectangular hole part that is argyle-shaped, square-shaped, hexagon-shaped, or the like, and the operation part 137B may be configured as a rectangular shaft part that can be fitted into the rectangular hole part.

For example, the coupling part 138A may be configured as an elliptic hole part, and the operation part 137B may be configured as an elliptic shaft part that can be fitted into the elliptic hole part.

For example, the coupling part 138A may be configured as a cross-shaped hole part, and the operation part 137B may be configured as a cross-shaped shaft part that can be fitted into the cross-shaped hole part.

2-7. The shape of the operation target part 149A of the swinging member 149 may be variously modified.

For example, the operation-target part 149A may have an operation-target surface that is formed so as to be likely to receive pressure from the operation part 137B of the operation member 137.

2-8. The position of the through hole 140 into which the operation member 137 is inserted may be variously modified depending on the position of the lock mechanism 131 or the like.

For example, in a configuration in which the lock mechanism 131 is provided at a position that is in the vicinity of the lower part of the front end of the bonnet 106 that is located at the closed position, the through hole 140 may be provided in a frame portion of the vehicle body frame 101 that is located in the vicinity of the lower part of the front end of the bonnet 106, or in the front cover 126 of the bonnet 106.

For example, in a configuration in which the lock mechanism 131 is provided at a position that is in the vicinity of the upper part of the rear end of the bonnet 106 that is located at the closed position, the through hole 140 may be located in the upper part of the rear end of the bonnet 106.

2-9. The work vehicle is not limited to a tractor, and may be a front loader, a mower, a rice transplanter, a combine, a wheel loader, a backhoe, or the like.

Third Embodiment

The following describes, as an example of a mode for carrying out the present invention, a third embodiment in which the present invention is applied to a tractor that is an example of a work vehicle with reference to the drawings.

Figure 24:
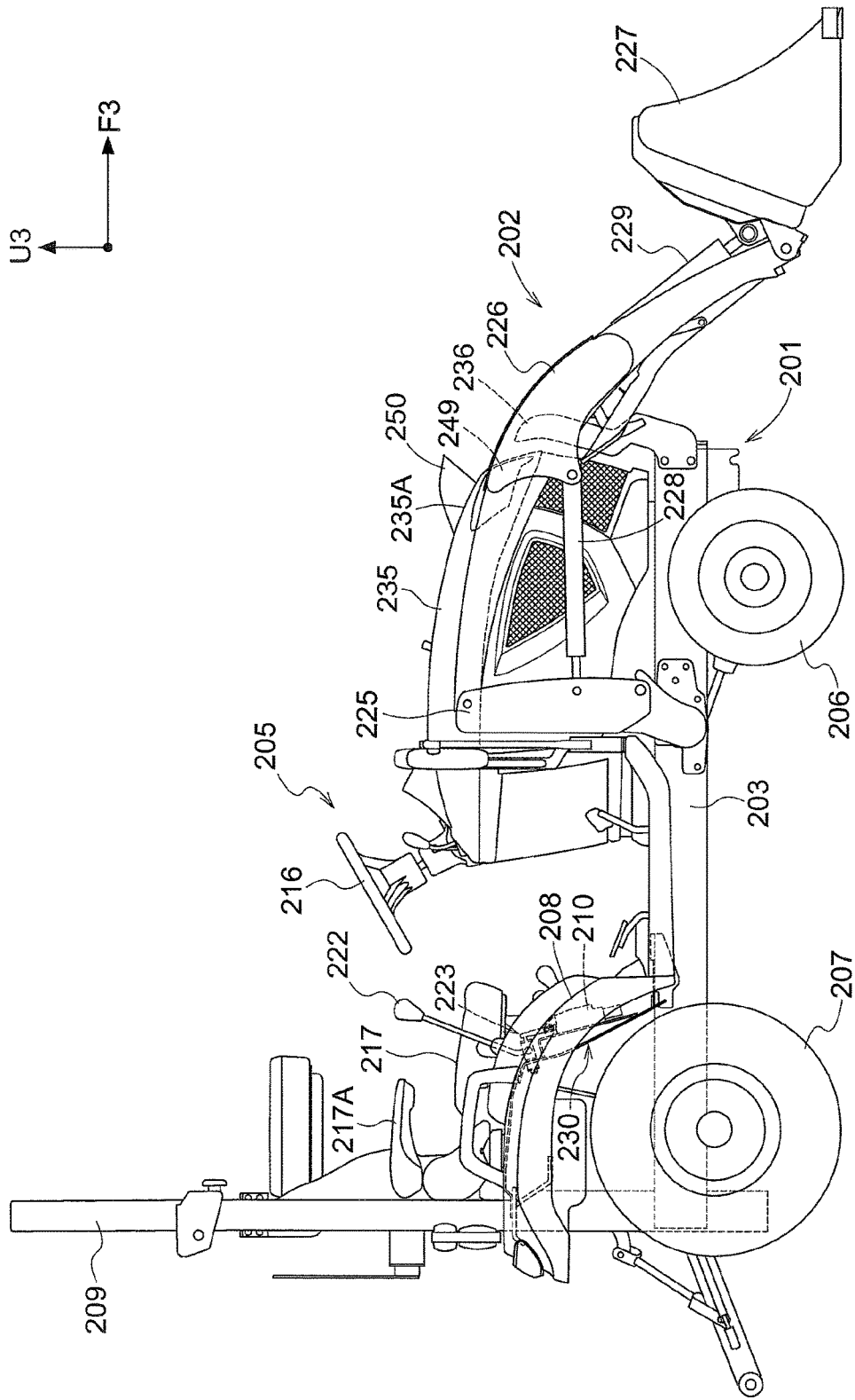
FIG. 24 shows a third embodiment, and is a right-side view of a tractor.

Note that the direction indicated by the arrow with a mark F3 shown in FIG. 24 is the forward direction of the tractor, and the direction indicated by the arrow with a mark U3 is the upward direction of the tractor.

Figure 25:
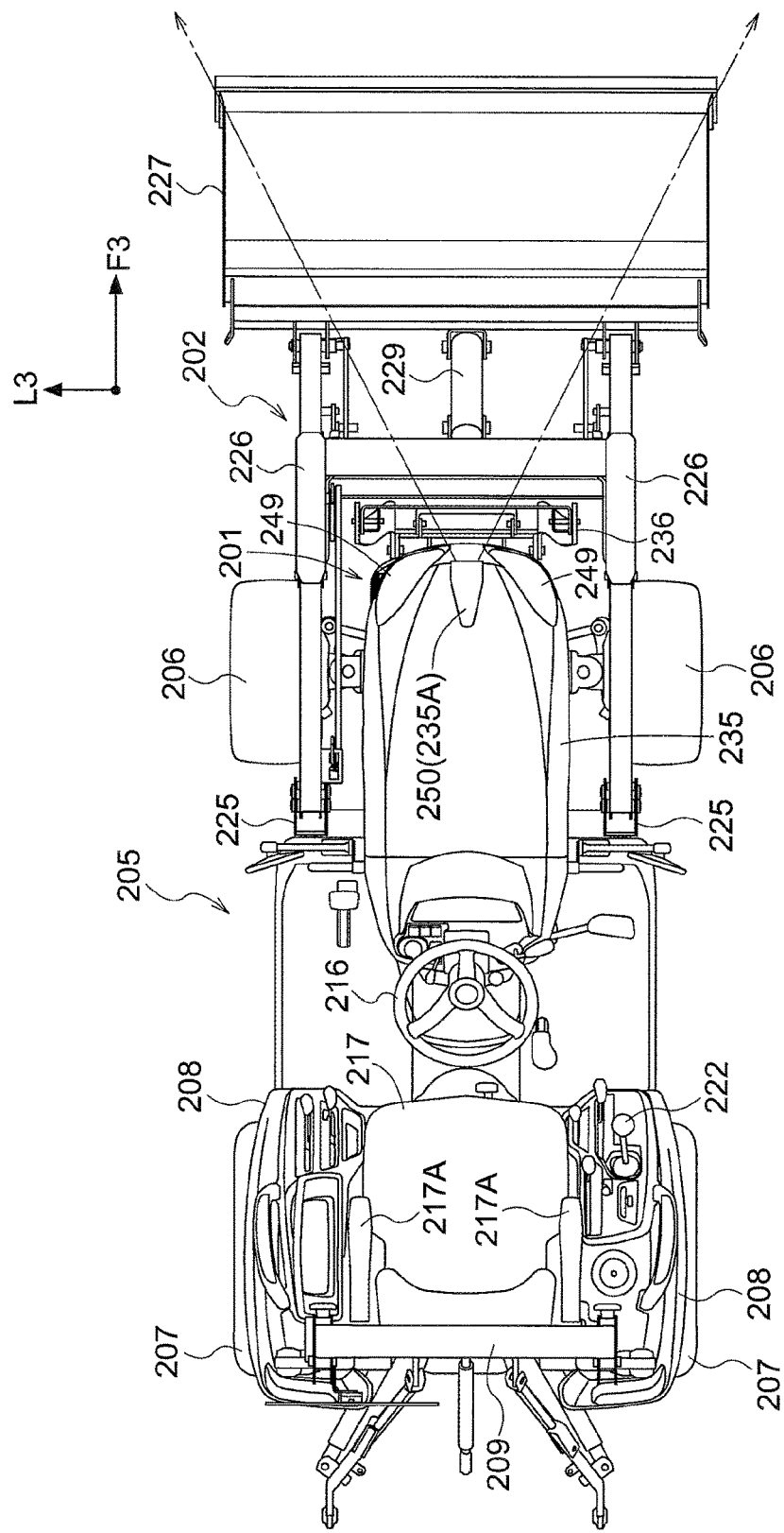
FIG. 25 shows the third embodiment, and is a plan view of the tractor, showing, for example, a direction in which a work light emits light.

The direction indicated by the arrow with the mark F3 shown in FIG. 25 is the forward direction of the tractor, and the direction indicated by the arrow with a mark L3 is the leftward direction of the tractor.

As shown in FIGS. 24 and 25, the tractor described in the second embodiment as an example is provided with: a passenger vehicle type travelling vehicle body 201; and a hydraulic operation type front loader 202 that is coupled to a front part of the travelling vehicle body 201.

The travelling vehicle body 201 is provided with, for example: a vehicle body frame 203 that constitutes the framework of the vehicle body; an engine (not shown) that is located on the front part side of the vehicle body; a driving part 205 of a boarding type that is located on the rear part side of the vehicle body; left and right front wheels 206 that can be steered and driven; left and right rear wheels 207 that are driven by a driving force from the engine; left and right rear fenders 208 that cover the left and right rear wheels 207; a protection frame 209 that is coupled to a rear end part of the vehicle body frame 203; and a valve unit 210 for the front loader.

The driving part 205 is provided with, for example: a steering wheel 216 for steering the front wheels; a driving seat 217 that has left and right armrests 217A; and an operation lever 222 for the front loader.

The operation lever 222 is located at a position that is forward of, and outside of the right armrest 217A of the driving seat 217 in a rightward direction in the driving part 205, and that is rearward of the front end of the right rear fender 208, within the width of the right rear fender 208 in the left-right direction.

This configuration allows the driver to easily operate the operation lever 222 using his/her right hand with his/her right arm being placed on the right armrest 217A. As a result, it is possible to reduce the degree of driver's fatigue during loader work. Also, this configuration makes the driver unlikely to touch the operation lever 222 when getting on or off the operation part 205 from the right side of the vehicle body. Therefore, it is easier for the driver to get on or off the operation part 205 from the right side of the vehicle body.

The valve unit 210 is provided in a space 230 between the right rear wheel 207 and the rear fender 208. The valve unit 210 is linked with the operation lever 222 that is located above the valve unit 210, with a linkage mechanism 223 for the front loader.

The front loader 202 is provided with, for example: left and right fixed brackets 225 that are detachably coupled to the vehicle body frame 203; left and right booms 226 that are coupled to the left and right fixed brackets and are configured to swing in the top-bottom direction; a bucket 227 that is coupled to free end parts of the left and right booms 226 and is configured to swing in the top-bottom direction; left and right boom cylinders 228 of a hydraulic and double-acting type that drive to swing the left and right booms 226; and a bucket cylinder 229 of a hydraulic and double-acting type that drives to swing the bucket 227.

The travelling vehicle body 201 is provided with, for example: a bonnet 235 that is located on a front part of the travelling vehicle body 201 and covers the engine or the like; a front guard 236 that is located forward of the front end part of the travelling vehicle body 201 and protects the front end part of the travelling vehicle body 201; and a headlight 249 that is located on an upper part of the front end of the bonnet 235.

Figure 26:
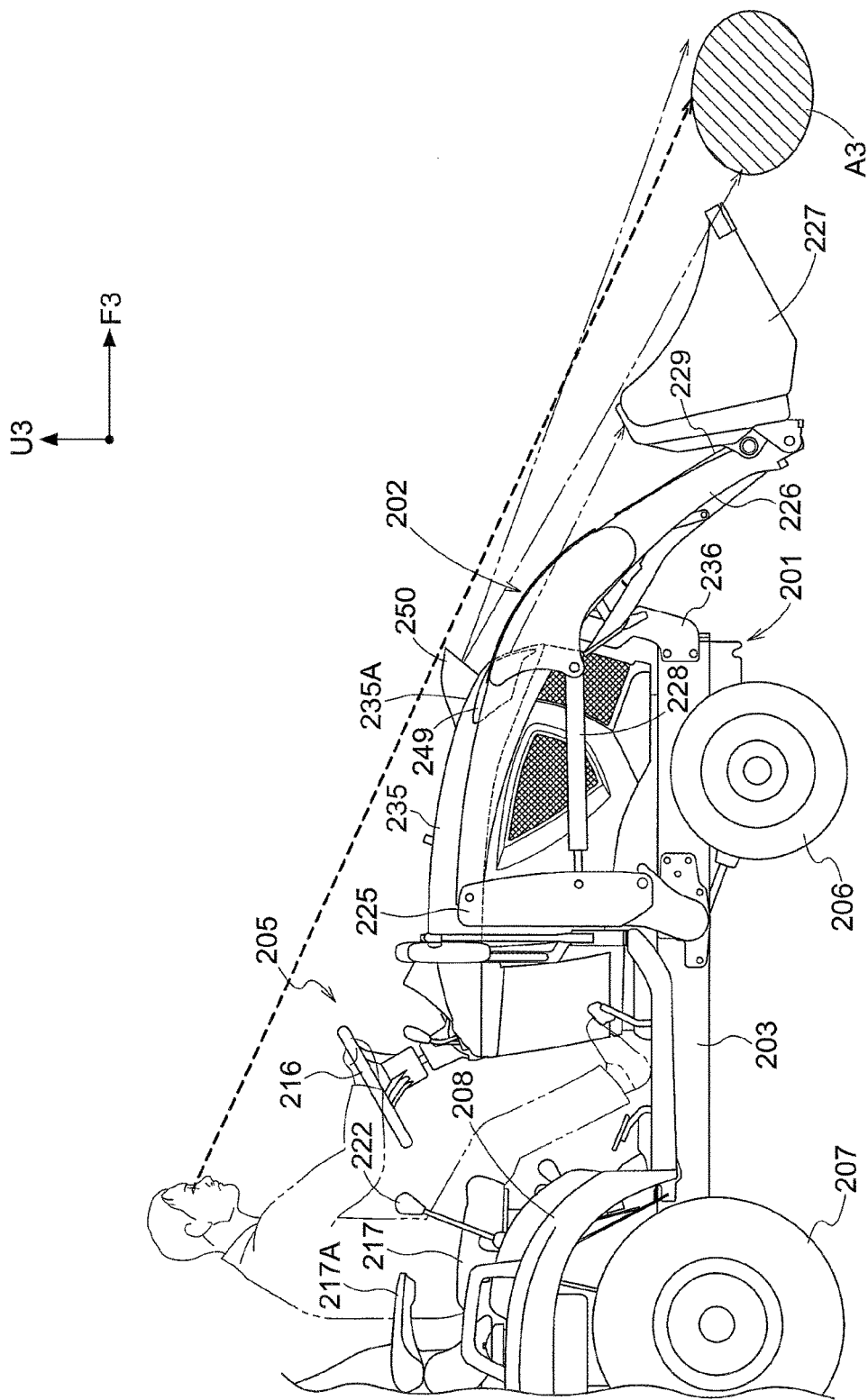
FIG. 26 shows the third embodiment, and is a right-side view of the tractor, showing, for example, a direction in which the work light emits light.

As shown in FIG. 26, if the headlight 249 is used for loader work at night, it is difficult for the driver to visually check the position of the front end of the bucket 227 and a work object A3 such as dirt located forward of the bucket 227 during, for example, scooping work using the front loader 202 that has been lowered such that the bucket 227 reaches the ground or a position that is substantially on the ground, because the headlight 249 is provided at a low position and light from the headlight 249 is blocked by the bucket 227 or the like.

Considering this problem, as shown in FIGS. 24 to 26, the travelling vehicle body 201 of this tractor is provided with a work light 250 for loader work that is provided at a position that is upward of the headlight 249 on the vehicle body 201. The work light 250 is provided on the travelling vehicle body 201 and is orientated so as to face an obliquely forward and downward direction to illuminate the front end side of the front loader 202 that is grounded.

With the above-described configuration, during loader work performed at night, it is possible to illuminate the front end part of and forward of the bucket 227, and so on with bright light from the work light 250 that is unlikely to be blocked by the bucket 227 or the like, by using the work light 250 during, for example, the above-described scooping work performed at a low position. Thus, for example, during scooping work performed at a low position, it is easier for the driver to visually check the position of the front end of the bucket 227 and the work object A3 such as dirt located forward of the bucket 227.

Consequently, it is easier to perform loader work at night, and it is possible to prevent the work efficiency of loader work performed at night from being degraded.

A central portion, in the left-right direction, of the upper end of a front part of the bonnet 235 is provided with an attachment part 235A for a center mascot. The work light 250 is attached to the attachment part 235A for a center mascot.

In other words, it is easy to attach the work light 250 to the central portion, in the left-right direction, of the upper end of the front part of the bonnet 235, without adding a new configuration for attaching the work light 250.

The work light 250 thus attached is located at a position that is upward of the headlight 249 on the travelling vehicle body 201 and that is close to the bucket 227, i.e. the work light 250 is located such that light from the work light 250 is unlikely to be blocked by the bucket 227, the front end part of the bonnet 235, or the like, during, for example, scooping work performed at a low position.

Thus, it is possible to illuminate the front end part of and forward of the bucket 227 with bright light from the work light 250, and, for example, during scooping work performed at a low position, it is even easier for the driver to visually check the position of the front end of the bucket 227 and the work object A3 such as dirt located forward of the bucket 227.

Consequently, the configuration is simplified and the attachability is improved, and it is even easier to perform loader work at night, and it is possible to more effectively prevent the work efficiency of loader work performed at night from being degraded.

As shown in FIG. 25, the range in the left-right direction that can be illuminated by the work light 250 is set to be so wide that the left and right ends of the bucket 227 located at a position that is on the ground or substantially on the ground are included in the range.

Figure 27:
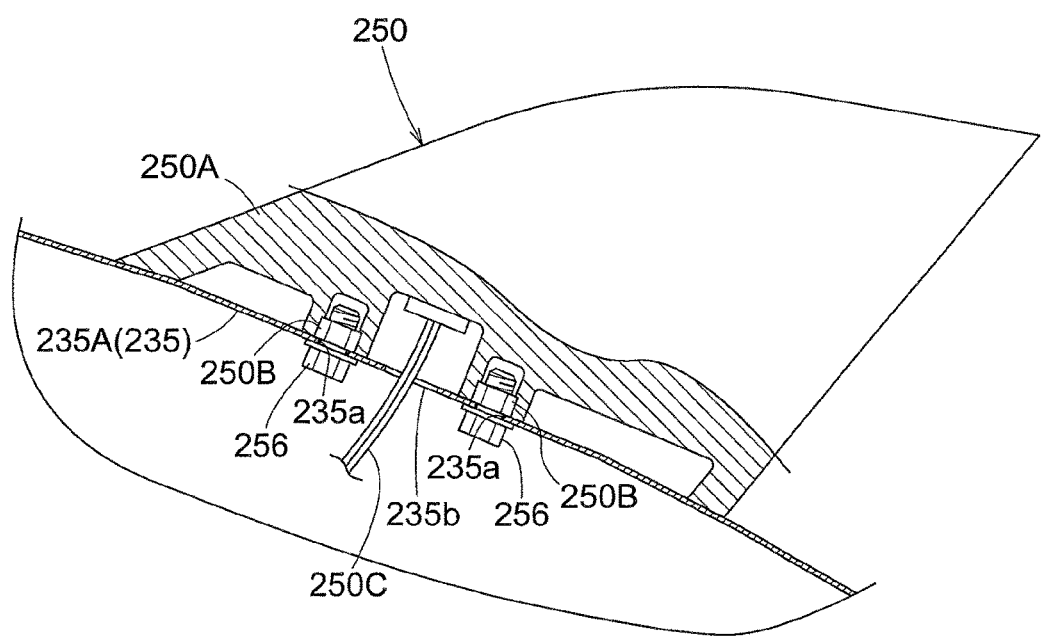
FIG. 27 shows the third embodiment, and is a vertical cross-sectional right-side view of the main part, showing a structure for attaching the work light.

As shown in FIG. 27, the center mascot attachment part 235A is provided with: first through holes 235a that have a small diameter and arranged in the front-rear direction; and a single second through hole 235b that has a large diameter and is located between the front and rear first through holes 235a. The bottom part of a casing 250A of the work light 250 is provided with front and rear embedded nuts 250B that realize bolt coupling using the front and rear first through holes 235a, and an electrical wire 250C that extends from a position between the front and rear embedded nuts 250B.

With this configuration, the operator can easily attach the work light 250 to a central portion, in the left-right direction, of the upper end of the front part of the bonnet 235 by first passing the electrical wire 250C of the work light 250 through the second through hole 235b of the attachment part 235A, and then screwing two bolts 256 that have been inserted into the first through holes 235a of the attachment part 235A into the front and rear embedded nuts 250B.

Other Embodiments Modified from Third Embodiment

The present invention is not limited to the configuration described as an example in the third embodiment above. The following describes other representative embodiments modified from the third embodiment.

3-1. The following configurations may be employed in the work vehicle.

For example, the work vehicle may be configured as a semi-crawler type work vehicle that is provided with left and right crawlers instead of the left and right rear wheels 207.

For example, the work vehicle may be configured as a full crawler work vehicle that is provided with left and right crawlers instead of the left and right front wheels 206 and the left and right rear wheels 207.

For example, the work vehicle may be configured as an electrical work vehicle that is provided with an electrical motor instead of the engine.

For example, the work vehicle may be configured as a hybrid work vehicle that is provided with the engine and an electrical motor.

For example, the work vehicle may be provided with an exhaust processing apparatus having a diesel particulate filter (DPF).

For example, the work vehicle may be configured without the front guard 236.

3-2. The position of the work light 250 may be variously modified insofar as the position is upward of the headlight 249 on the travelling vehicle body 201.

For example, the work light 250 may be provided in a portion of the bonnet 235 that is adjacent to the center mascot.

For example, the work light 250 may be provided at an upper end portion of an intermediate part, in the front-rear direction, of the bonnet 235.

3-3. The work light 250 may be attached to an upper end part of the front guard 236 so as to be located at a position that is upward of the headlight 249 on the vehicle body.

With this configuration, the work light 250 can be located at a position that is upward of the headlight 249 on the travelling vehicle body 201, and that is closest to the bucket 227 and so on. In other words, the work light 250 can be located such that light from the work light 250 is not blocked by the front end part of the travelling vehicle body 201 and is unlikely to be blocked by the bucket 227 during, for example, scooping work performed at a low position.

Thus, it is possible to more appropriately illuminate the front end part of and forward of the bucket 227 with bright light from the work light 250. Therefore, for example, during scooping work performed at a low position, it is even easier for the driver to visually check the position of the front end of the bucket 227 and the work object A3 such as dirt located forward of the bucket 227.

Consequently, it is even easier to perform loader work at night, and it is possible to more effectively prevent the work efficiency of loader work performed at night from being degraded.

3-4. The work light 250 may be a pair of left and right work lights, and may be located on upper end portions of the bonnet 235 on the left and right end sides, for example.

3-5. The work vehicle is not limited to a tractor, and may be a wheel loader, for example.

What is claimed is:

1. A work vehicle comprising:
   a vehicle body frame;
   a prime mover part located on a front part or a rear part of the vehicle body frame;
   a bonnet configured to open and close by swinging, and covering the prime mover part; and
   an assist unit configured to assist an operation to open the bonnet,
   wherein
   the bonnet is an integrated member in which: an end cover located on one end part of the vehicle body frame in a front-rear direction, and covering one end part of the prime mover part in the front-rear direction; left and right side covers covering lateral side parts of the prime mover part; and an upper cover covering an upper part of the prime mover part are integrally joined, and is configured to open and close by swinging about a pivot shaft that is located on one end part of the vehicle body frame in the left-right direction and is orientated in a left-right direction,
   a lateral end portion of the vehicle body frame is provided with a first linkage part with which the assist unit is linked,
   a lateral end portion of a lower end part of the bonnet is provided with a second linkage part with which the assist unit is linked, the lateral end portion of the bonnet being located closer to the end cover than the first linkage part is, and
   the assist unit is provided with an expansion/contraction mechanism biased so as to expand, and is located laterally outside the prime mover part and spans the first linkage part and the second linkage part,
   wherein the assist unit is provided with: a guide member that is located on a portion of the vehicle body frame that is located closer to the end cover than the first linkage part is; and a linkage member that spans the guide member and the second linkage part.

2. The work vehicle according to claim 1, wherein
   the guide member is provided with a guide part configured to guide, in the front-rear direction, a third linkage part that is located on one end side of the linkage member,
   a portion of the linkage member is provided with a fifth linkage part, the portion being located closer to the guide member than a fourth linkage part is, and the fourth linkage part being linked with the second linkage part, and
   the expansion/contraction mechanism spans the first linkage part and the fifth linkage part.

* * * * *